United States Patent
Chopra et al.

(10) Patent No.: US 10,218,580 B2
(45) Date of Patent: Feb. 26, 2019

(54) GENERATING PHYSICALLY AWARE NETWORK-ON-CHIP DESIGN FROM A PHYSICAL SYSTEM-ON-CHIP SPECIFICATION

(71) Applicant: NetSpeed Systems, San Jose, CA (US)

(72) Inventors: Rajesh Chopra, San Ramon, CA (US); Yang-Trung Lin, San Jose, CA (US); Sailesh Kumar, San Jose, CA (US)

(73) Assignee: NETSPEED SYSTEMS, San Jose, CA (US)

( * ) Notice: Subject to any disclaimer, the term of this patent is extended or adjusted under 35 U.S.C. 154(b) by 165 days.

(21) Appl. No.: 14/743,865

(22) Filed: Jun. 18, 2015

(65) Prior Publication Data

US 2017/0230253 A1    Aug. 10, 2017

(51) Int. Cl.
H04L 12/24    (2006.01)
H04L 12/933    (2013.01)

(52) U.S. Cl.
CPC ............ H04L 41/145 (2013.01); H04L 41/12 (2013.01); H04L 49/109 (2013.01); Y04S 40/164 (2013.01)

(58) Field of Classification Search
None
See application file for complete search history.

(56) References Cited

U.S. PATENT DOCUMENTS

| | | | |
|---|---|---|---|
| 4,409,838 A | 10/1983 | Schomberg | |
| 4,933,933 A | 6/1990 | Dally et al. | |
| 5,105,424 A | 4/1992 | Flaig et al. | |
| 5,163,016 A | 11/1992 | Har'El et al. | |
| 5,355,455 A | 10/1994 | Hilgendorf et al. | |
| 5,432,785 A | 7/1995 | Ahmed et al. | |

(Continued)

FOREIGN PATENT DOCUMENTS

| | | |
|---|---|---|
| CN | 103684961 A | 3/2014 |
| JP | 5936793 | 5/2016 |

(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.

(Continued)

*Primary Examiner* — Jason E Mattis
*Assistant Examiner* — Hong Shao
(74) *Attorney, Agent, or Firm* — Procopio, Cory, Hargreaves & Savitch LLP

(57) ABSTRACT

Different example implementations of the present disclosure relates to methods and computer readable mediums for automatically generating physically aware NoC design and physically aware NoC Specification based on one or more of given SoC architectural details, physical information of SoC, traffic specification, power profile and one or more constraints. The method includes steps of receiving input information, determining the location/position of different NoC agents, interconnecting channels, pins, I/O interfaces, physical/virtual boundaries, number of layers, size/depth/width of different channels at different time, and locating/configuring the different NoC agents, interconnecting channels, pins, I/O interfaces, and physical/virtual boundaries.

18 Claims, 16 Drawing Sheets

(56) References Cited

U.S. PATENT DOCUMENTS

| | | |
|---|---|---|
| 5,563,003 A | 10/1996 | Suzuki et al. |
| 5,583,990 A | 12/1996 | Birrittella et al. |
| 5,588,152 A | 12/1996 | Dapp et al. |
| 5,764,740 A | 6/1998 | Holender |
| 5,790,554 A | 8/1998 | Pitcher |
| 5,859,981 A | 1/1999 | Levin et al. |
| 5,991,308 A | 11/1999 | Fuhrmann et al. |
| 5,999,530 A | 12/1999 | LeMaire |
| 6,003,029 A | 12/1999 | Agrawal et al. |
| 6,029,220 A | 2/2000 | Iwamura et al. |
| 6,058,385 A | 5/2000 | Koza et al. |
| 6,101,181 A | 8/2000 | Passint et al. |
| 6,108,739 A | 8/2000 | James et al. |
| 6,249,902 B1 | 6/2001 | Igusa et al. |
| 6,314,487 B1 | 11/2001 | Hahn et al. |
| 6,377,543 B1 | 4/2002 | Grover |
| 6,415,282 B1 | 7/2002 | Mukherjea et al. |
| 6,674,720 B1 | 1/2004 | Passint et al. |
| 6,701,361 B1 | 3/2004 | Meier |
| 6,711,717 B2 | 3/2004 | Nystrom et al. |
| 6,778,531 B1 | 8/2004 | Kodialam |
| 6,925,627 B1 | 8/2005 | Longway et al. |
| 6,967,926 B1 | 11/2005 | Williams, Jr. et al. |
| 6,983,461 B2 | 1/2006 | Hutchison et al. |
| 7,046,633 B2 | 5/2006 | Carvey |
| 7,065,730 B2 | 6/2006 | Alpert et al. |
| 7,143,221 B2 | 11/2006 | Bruce et al. |
| 7,318,214 B1 | 1/2008 | Prasad et al. |
| 7,379,424 B1 | 5/2008 | Krueger |
| 7,437,518 B2 | 10/2008 | Tsien |
| 7,461,236 B1 | 12/2008 | Wentzlaff |
| 7,509,619 B1 | 3/2009 | Miller et al. |
| 7,564,865 B2 | 7/2009 | Radulescu |
| 7,583,602 B2 | 9/2009 | Bejerano |
| 7,590,959 B2 | 9/2009 | Tanaka |
| 7,693,064 B2 | 4/2010 | Thubert et al. |
| 7,701,252 B1 | 4/2010 | Chow et al. |
| 7,724,735 B2 | 5/2010 | Locatelli et al. |
| 7,725,859 B1 | 5/2010 | Lenahan et al. |
| 7,774,783 B2 | 8/2010 | Toader |
| 7,808,968 B1 | 10/2010 | Kalmanek, Jr. et al. |
| 7,853,774 B1 | 12/2010 | Wentzlaff |
| 7,917,885 B2 | 3/2011 | Becker |
| 7,957,381 B2 | 6/2011 | Clermidy et al. |
| 7,973,804 B2 | 7/2011 | Mejdrich et al. |
| 8,018,249 B2 | 9/2011 | Koch et al. |
| 8,020,163 B2 | 9/2011 | Nollet et al. |
| 8,020,168 B2 | 9/2011 | Hoover et al. |
| 8,050,256 B1 | 11/2011 | Bao et al. |
| 8,059,551 B2 | 11/2011 | Milliken |
| 8,098,677 B1 | 1/2012 | Pleshek |
| 8,099,757 B2 | 1/2012 | Riedle et al. |
| 8,136,071 B2 | 3/2012 | Solomon |
| 8,203,938 B2 | 6/2012 | Gibbings |
| 8,261,025 B2 | 9/2012 | Mejdrich et al. |
| 8,281,297 B2 | 10/2012 | Dasu et al. |
| 8,306,042 B1 | 11/2012 | Abts |
| 8,312,402 B1 | 11/2012 | Okhmatovski et al. |
| 8,352,774 B2 | 1/2013 | Elrabaa |
| 8,407,425 B2 | 3/2013 | Gueron et al. |
| 8,412,795 B2 | 4/2013 | Mangano et al. |
| 8,438,578 B2 | 5/2013 | Hoover et al. |
| 8,448,102 B2 | 5/2013 | Kornachuk et al. |
| 8,490,110 B2 | 7/2013 | Hoover et al. |
| 8,492,886 B2 | 7/2013 | Or-Bach et al. |
| 8,503,445 B2 | 8/2013 | Lo |
| 8,514,889 B2 | 8/2013 | Jayasimha |
| 8,541,819 B1 | 9/2013 | Or-Bach et al. |
| 8,543,964 B2 | 9/2013 | Ge et al. |
| 8,572,353 B1 | 10/2013 | Bratt |
| 8,601,423 B1 | 12/2013 | Philip et al. |
| 8,614,955 B2 | 12/2013 | Gintis |
| 8,619,622 B2 | 12/2013 | Harrand et al. |
| 8,635,577 B2 | 1/2014 | Kazda et al. |
| 8,661,455 B2 | 2/2014 | Mejdrich et al. |
| 8,667,439 B1 | 3/2014 | Kumar et al. |
| 8,705,368 B1 | 4/2014 | Abts et al. |
| 8,711,867 B2 | 4/2014 | Guo et al. |
| 8,717,875 B2 | 5/2014 | Bejerano et al. |
| 8,726,295 B2 | 5/2014 | Hoover et al. |
| 8,738,860 B1 | 5/2014 | Griffin et al. |
| 8,793,644 B2 | 7/2014 | Michel et al. |
| 8,798,038 B2 | 8/2014 | Jayasimha et al. |
| 8,819,611 B2 | 8/2014 | Philip et al. |
| 8,885,510 B2 | 11/2014 | Kumar et al. |
| 9,210,048 B1 | 12/2015 | Marr |
| 9,223,711 B2 | 12/2015 | Philip et al. |
| 9,244,845 B2 | 1/2016 | Rowlands et al. |
| 9,244,880 B2 | 1/2016 | Philip et al. |
| 9,253,085 B2 | 2/2016 | Kumar et al. |
| 9,294,354 B2 | 3/2016 | Kumar |
| 9,319,232 B2 | 4/2016 | Kumar |
| 9,444,702 B1 | 9/2016 | Raponi et al. |
| 9,471,726 B2 | 10/2016 | Kumar et al. |
| 9,473,359 B2 | 10/2016 | Kumar et al. |
| 9,473,388 B2 | 10/2016 | Kumar et al. |
| 9,473,415 B2 | 10/2016 | Kumar |
| 9,477,280 B1 | 10/2016 | Gangwar et al. |
| 9,529,400 B1 | 12/2016 | Kumar et al. |
| 9,535,848 B2 | 1/2017 | Rowlands et al. |
| 9,568,970 B1 | 2/2017 | Kaushal et al. |
| 9,569,579 B1 | 2/2017 | Kumar |
| 9,571,341 B1 | 2/2017 | Kumar et al. |
| 9,571,402 B2 | 2/2017 | Kumar et al. |
| 9,571,420 B2 | 2/2017 | Kumar |
| 9,590,813 B1 | 3/2017 | Kumar et al. |
| 9,660,942 B2 | 5/2017 | Kumar |
| 9,699,079 B2 | 7/2017 | Chopra et al. |
| 9,742,630 B2 | 8/2017 | Philip et al. |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2002/0150094 A1 | 10/2002 | Cheng |
| 2003/0005149 A1 | 1/2003 | Haas |
| 2003/0088602 A1 | 5/2003 | Dutta et al. |
| 2003/0145314 A1 | 7/2003 | Nguyen et al. |
| 2003/0200315 A1 | 10/2003 | Goldenberg |
| 2004/0006584 A1 | 1/2004 | Vandeweerd |
| 2004/0019814 A1 | 1/2004 | Pappalardo |
| 2004/0049565 A1 | 3/2004 | Keller et al. |
| 2004/0103218 A1 | 5/2004 | Blumrich et al. |
| 2004/0156376 A1 | 8/2004 | Nakagawa |
| 2004/0156383 A1 | 8/2004 | Nakagawa |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2005/0204316 A1* | 9/2005 | Nebel ............... G06F 17/5022 716/103 |
| 2005/0228930 A1 | 10/2005 | Ning et al. |
| 2005/0286543 A1 | 12/2005 | Coppola et al. |
| 2006/0002303 A1 | 1/2006 | Bejerano |
| 2006/0031615 A1 | 2/2006 | Bruce et al. |
| 2006/0053312 A1 | 3/2006 | Jones |
| 2006/0075169 A1 | 4/2006 | Harris et al. |
| 2006/0104274 A1 | 5/2006 | Caviglia |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0189283 A1 | 8/2007 | Agarwal et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0127014 A1 | 5/2008 | Pandey |

(56) References Cited

U.S. PATENT DOCUMENTS

| | | |
|---|---|---|
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0067331 A1 | 3/2009 | Watsen |
| 2009/0067348 A1 | 3/2009 | Vasseur |
| 2009/0070726 A1 | 3/2009 | Mehrotra et al. |
| 2009/0083263 A1 | 3/2009 | Felch |
| 2009/0089725 A1 | 4/2009 | Khan |
| 2009/0109996 A1 | 4/2009 | Hoover |
| 2009/0122703 A1 | 5/2009 | Gangwal et al. |
| 2009/0125574 A1 | 5/2009 | Mejdrich |
| 2009/0125703 A1 | 5/2009 | Mejdrich |
| 2009/0125703 A1 | 5/2009 | Mejdrich |
| 2009/0125706 A1 | 5/2009 | Hoover |
| 2009/0135739 A1 | 5/2009 | Hoover |
| 2009/0138567 A1 | 5/2009 | Hoover |
| 2009/0150647 A1 | 6/2009 | Mejdrich |
| 2009/0157976 A1 | 6/2009 | Comparan |
| 2009/0172304 A1 | 7/2009 | Gueron et al. |
| 2009/0182944 A1 | 7/2009 | Comparan |
| 2009/0182954 A1 | 7/2009 | Mejdrich |
| 2009/0182986 A1 | 7/2009 | Schwinn |
| 2009/0182987 A1 | 7/2009 | Mejdrich |
| 2009/0187716 A1 | 7/2009 | Comparan et al. |
| 2009/0187734 A1 | 7/2009 | Mejdrich |
| 2009/0187756 A1 | 7/2009 | Nollet et al. |
| 2009/0201302 A1 | 8/2009 | Hoover |
| 2009/0210184 A1 | 8/2009 | Medardoni et al. |
| 2009/0210883 A1 | 8/2009 | Hoover |
| 2009/0228681 A1 | 9/2009 | Mejdrich |
| 2009/0228682 A1 | 9/2009 | Mejdrich |
| 2009/0228689 A1 | 9/2009 | Muff |
| 2009/0228690 A1 | 9/2009 | Muff |
| 2009/0231348 A1 | 9/2009 | Mejdrich et al. |
| 2009/0231349 A1 | 9/2009 | Mejdrich |
| 2009/0240920 A1 | 9/2009 | Muff |
| 2009/0245257 A1 | 10/2009 | Comparan |
| 2009/0256836 A1 | 10/2009 | Fowler |
| 2009/0260013 A1 | 10/2009 | Heil |
| 2009/0268677 A1 | 10/2009 | Chou et al. |
| 2009/0271172 A1 | 10/2009 | Mejdrich |
| 2009/0276572 A1 | 11/2009 | Heil |
| 2009/0282139 A1 | 11/2009 | Mejdrich |
| 2009/0282197 A1 | 11/2009 | Comparan |
| 2009/0282211 A1 | 11/2009 | Hoover |
| 2009/0282214 A1 | 11/2009 | Kuesel |
| 2009/0282221 A1 | 11/2009 | Heil |
| 2009/0282222 A1 | 11/2009 | Hoover |
| 2009/0282226 A1 | 11/2009 | Hoover |
| 2009/0282227 A1 | 11/2009 | Hoover |
| 2009/0282419 A1 | 11/2009 | Mejdrich |
| 2009/0285222 A1 | 11/2009 | Hoover et al. |
| 2009/0287885 A1 | 11/2009 | Kriegel |
| 2009/0292907 A1 | 11/2009 | Schwinn |
| 2009/0293061 A1 | 11/2009 | Schwinn |
| 2009/0300292 A1 | 12/2009 | Fang et al. |
| 2009/0300335 A1 | 12/2009 | Muff |
| 2009/0307714 A1 | 12/2009 | Hoover et al. |
| 2009/0313592 A1 | 12/2009 | Murali et al. |
| 2009/0315908 A1 | 12/2009 | Comparan |
| 2010/0023568 A1 | 1/2010 | Hickey |
| 2010/0031009 A1 | 2/2010 | Muff |
| 2010/0040162 A1 | 2/2010 | Suehiro |
| 2010/0042812 A1 | 2/2010 | Hickey |
| 2010/0042813 A1 | 2/2010 | Hickey |
| 2010/0070714 A1 | 3/2010 | Hoover |
| 2010/0091787 A1 | 4/2010 | Muff |
| 2010/0100707 A1 | 4/2010 | Mejdrich |
| 2010/0100712 A1 | 4/2010 | Mejdrich |
| 2010/0100770 A1 | 4/2010 | Mejdrich |
| 2010/0100934 A1 | 4/2010 | Mejdrich |
| 2010/0106940 A1 | 4/2010 | Muff |
| 2010/0125722 A1 | 5/2010 | Hickey |
| 2010/0158005 A1 | 6/2010 | Mukhopadhyay et al. |
| 2010/0162019 A1 | 6/2010 | Kumar |
| 2010/0189111 A1 | 7/2010 | Muff |
| 2010/0191940 A1 | 7/2010 | Mejdrich |
| 2010/0211718 A1 | 8/2010 | Gratz et al. |
| 2010/0223505 A1 | 9/2010 | Andreev et al. |
| 2010/0228781 A1 | 9/2010 | Fowler |
| 2010/0239185 A1 | 9/2010 | Fowler |
| 2010/0239186 A1 | 9/2010 | Fowler |
| 2010/0242003 A1 | 9/2010 | Kwok |
| 2010/0269123 A1 | 10/2010 | Mejdrich |
| 2010/0284309 A1 | 11/2010 | Allan |
| 2010/0333099 A1 | 12/2010 | Kupferschmidt |
| 2011/0022754 A1 | 1/2011 | Cidon et al. |
| 2011/0035523 A1 | 2/2011 | Feero et al. |
| 2011/0044336 A1 | 2/2011 | Umeshima |
| 2011/0060831 A1 | 3/2011 | Ishii et al. |
| 2011/0063285 A1 | 3/2011 | Hoover |
| 2011/0064077 A1 | 3/2011 | Wen |
| 2011/0072407 A1 | 3/2011 | Keinert et al. |
| 2011/0085550 A1 | 4/2011 | Lecler et al. |
| 2011/0085561 A1 | 4/2011 | Ahn |
| 2011/0103799 A1 | 5/2011 | Shacham et al. |
| 2011/0119322 A1 | 5/2011 | Li |
| 2011/0154282 A1 | 6/2011 | Chang et al. |
| 2011/0173258 A1 | 7/2011 | Arimilli |
| 2011/0191088 A1 | 8/2011 | Hsu et al. |
| 2011/0191774 A1 | 8/2011 | Hsu et al. |
| 2011/0235531 A1 | 9/2011 | Vangal et al. |
| 2011/0243147 A1 | 10/2011 | Paul |
| 2011/0276937 A1 | 11/2011 | Waller |
| 2011/0289485 A1 | 11/2011 | Mejdrich |
| 2011/0292063 A1 | 12/2011 | Mejdrich |
| 2011/0302345 A1 | 12/2011 | Boucard et al. |
| 2011/0302450 A1 | 12/2011 | Hickey |
| 2011/0307734 A1 | 12/2011 | Boesen et al. |
| 2011/0316864 A1 | 12/2011 | Mejdrich |
| 2011/0320719 A1 | 12/2011 | Mejdrich |
| 2011/0320724 A1 | 12/2011 | Mejdrich |
| 2011/0320771 A1 | 12/2011 | Mejdrich |
| 2011/0320854 A1 | 12/2011 | Elrabaa |
| 2011/0320991 A1 | 12/2011 | Hsu |
| 2011/0321057 A1 | 12/2011 | Mejdrich |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0054511 A1 | 3/2012 | Brinks |
| 2012/0072635 A1 | 3/2012 | Yoshida |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0144065 A1 | 6/2012 | Parker |
| 2012/0155250 A1 | 6/2012 | Carney et al. |
| 2012/0173846 A1 | 7/2012 | Wang et al. |
| 2012/0176364 A1 | 7/2012 | Schardt |
| 2012/0195321 A1 | 8/2012 | Ramanujam |
| 2012/0198408 A1 | 8/2012 | Chopra |
| 2012/0209944 A1 | 8/2012 | Mejdrich et al. |
| 2012/0218998 A1 | 8/2012 | Sarikaya |
| 2012/0221711 A1 | 8/2012 | Kuesel |
| 2012/0260252 A1 | 10/2012 | Kuesel |
| 2012/0311512 A1* | 12/2012 | Michel ............... G06F 17/5031 716/104 |
| 2013/0021896 A1 | 1/2013 | Pu |
| 2013/0028083 A1 | 1/2013 | Yoshida |
| 2013/0028090 A1 | 1/2013 | Yamaguchi et al. |
| 2013/0028261 A1 | 1/2013 | Lee |
| 2013/0036296 A1 | 2/2013 | Hickey |
| 2013/0044117 A1 | 2/2013 | Mejdrich |
| 2013/0046518 A1 | 2/2013 | Mejdrich |
| 2013/0051397 A1 | 2/2013 | Guo et al. |
| 2013/0054811 A1 | 2/2013 | Harrand |
| 2013/0073771 A1 | 3/2013 | Hanyu |
| 2013/0073878 A1 | 3/2013 | Jayasimha |
| 2013/0080073 A1 | 3/2013 | de Corral |
| 2013/0080671 A1 | 3/2013 | Ishii |
| 2013/0086399 A1 | 4/2013 | Tychon |
| 2013/0103369 A1 | 4/2013 | Huynh et al. |

(56) References Cited

U.S. PATENT DOCUMENTS

| | | |
|---|---|---|
| 2013/0103912 A1 | 4/2013 | Jones et al. |
| 2013/0111190 A1 | 5/2013 | Muff |
| 2013/0111242 A1 | 5/2013 | Heller |
| 2013/0117543 A1 | 5/2013 | Venkataramanan et al. |
| 2013/0138925 A1 | 5/2013 | Hickey |
| 2013/0145128 A1 | 6/2013 | Schardt |
| 2013/0148506 A1 | 6/2013 | Lea |
| 2013/0151215 A1 | 6/2013 | Mustapha |
| 2013/0159668 A1 | 6/2013 | Muff |
| 2013/0159669 A1 | 6/2013 | Comparan |
| 2013/0159674 A1 | 6/2013 | Muff |
| 2013/0159675 A1 | 6/2013 | Muff |
| 2013/0159676 A1 | 6/2013 | Muff |
| 2013/0159944 A1 | 6/2013 | Uno et al. |
| 2013/0160026 A1 | 6/2013 | Kuesel |
| 2013/0160114 A1 | 6/2013 | Greenwood |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0185542 A1 | 7/2013 | Mejdrich |
| 2013/0191572 A1 | 7/2013 | Nooney et al. |
| 2013/0191600 A1 | 7/2013 | Kuesel |
| 2013/0191649 A1 | 7/2013 | Muff |
| 2013/0191651 A1 | 7/2013 | Muff |
| 2013/0191824 A1 | 7/2013 | Muff |
| 2013/0191825 A1 | 7/2013 | Muff |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0294458 A1 | 11/2013 | Yamaguchi et al. |
| 2013/0305207 A1 | 11/2013 | Hsieh |
| 2013/0311819 A1 | 11/2013 | Ishii |
| 2013/0326458 A1 | 12/2013 | Kazda et al. |
| 2014/0013293 A1 | 1/2014 | Hsu |
| 2014/0068132 A1 | 3/2014 | Philip et al. |
| 2014/0068134 A1 | 3/2014 | Philip et al. |
| 2014/0082237 A1* | 3/2014 | Wertheimer ........ G06F 13/4022 710/104 |
| 2014/0086260 A1 | 3/2014 | Dai |
| 2014/0092740 A1 | 4/2014 | Wang et al. |
| 2014/0098683 A1* | 4/2014 | Kumar .................. H04L 49/109 370/252 |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0126572 A1 | 5/2014 | Hutton |
| 2014/0143557 A1 | 5/2014 | Kuesel |
| 2014/0143558 A1 | 5/2014 | Kuesel |
| 2014/0149720 A1 | 5/2014 | Muff |
| 2014/0164465 A1 | 6/2014 | Muff |
| 2014/0164704 A1 | 6/2014 | Kuesel |
| 2014/0164732 A1 | 6/2014 | Muff |
| 2014/0164734 A1 | 6/2014 | Muff |
| 2014/0211622 A1 | 7/2014 | Kumar et al. |
| 2014/0229709 A1 | 8/2014 | Kuesel |
| 2014/0229712 A1 | 8/2014 | Muff |
| 2014/0229713 A1 | 8/2014 | Muff |
| 2014/0229714 A1 | 8/2014 | Muff |
| 2014/0229720 A1 | 8/2014 | Hickey |
| 2014/0230077 A1 | 8/2014 | Muff |
| 2014/0232188 A1 | 8/2014 | Cheriyan |
| 2014/0241376 A1 | 8/2014 | Balkan |
| 2014/0254388 A1 | 9/2014 | Kumar et al. |
| 2014/0281243 A1 | 9/2014 | Shalf |
| 2014/0281402 A1 | 9/2014 | Comparan |
| 2014/0307590 A1 | 10/2014 | Dobbelaere |
| 2014/0359641 A1 | 12/2014 | Clark |
| 2014/0376569 A1 | 12/2014 | Philip |
| 2015/0020078 A1 | 1/2015 | Kuesel |
| 2015/0026435 A1 | 1/2015 | Muff |
| 2015/0026494 A1 | 1/2015 | Bainbridge |
| 2015/0026500 A1 | 1/2015 | Muff |
| 2015/0032988 A1 | 1/2015 | Muff |
| 2015/0032999 A1 | 1/2015 | Muff |
| 2015/0043575 A1 | 2/2015 | Kumar et al. |
| 2015/0081941 A1 | 3/2015 | Brown |
| 2015/0103822 A1 | 4/2015 | Gianchandani |
| 2015/0109024 A1 | 4/2015 | Abdelfattah et al. |
| 2015/0159330 A1 | 6/2015 | Weisman et al. |
| 2015/0178435 A1 | 6/2015 | Kumar |
| 2015/0331831 A1 | 11/2015 | Solihin |
| 2015/0348600 A1 | 12/2015 | Bhatia |
| 2015/0381707 A1 | 12/2015 | How |
| 2017/0061053 A1 | 3/2017 | Kumar et al. |
| 2017/0063625 A1 | 3/2017 | Philip et al. |
| 2017/0063697 A1 | 3/2017 | Kumar |

FOREIGN PATENT DOCUMENTS

| | | |
|---|---|---|
| JP | 6060316 B2 | 1/2017 |
| JP | 6093867 B2 | 2/2017 |
| KR | 10-2013-0033898 A1 | 4/2013 |
| KR | 101652490 | 8/2016 |
| KR | 101707655 | 2/2017 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPOLS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, pgs. 253-262.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Hestness, J., et al., Netrace: Dependency-Tracking for Efficient Network-on-Chip Experimentation, The University of Texas at Austin, Dept. Of Computer Science, May 2011, 20 pgs.

Jiang, N., et al., Performance Implications of Age-Based Allocations in On-Chip Networks, CVA MEMO 129, May 24, 2011, 21 pgs.

Lee, J. W. et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al,. Approximating Age-Based Arbitration in On-Chip Networks, PACT '10, Sep. 11-15, 2010, 2 pgs.

Li, B. et al.' CoQoS: Coordinating QoS-Aware Shared Resources in NoC-based SoCs, J. Parallel Distrib. Comput., 71(5), May 2011, 14 pgs.

Lin, S., et al., Scalable Connection-Based Flow Control Scheme for Application-Specific Network-on-Chip, The Journal of China Universities of Posts and Telecommunications, Dec. 2011, 18(6), pp. 98-105.

(56) References Cited

OTHER PUBLICATIONS

Bolotin, Evgency, et al., "QNoC: QoS Architecture and Design Process for Network on Chip" 2004, 24 pp., Journal of Systems Architecture 50 (2004) 105-128 Elsevier.

Holsmark, Shashi Kumar Rickard, et al., "HiRA: A Methodology for Deadlock Free Routing in Hierarchical Networks on Chip", 10 pages, (978-1-4244-4143-3/09 2009 IEEE).

Munirul, H. M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.

Rajesh Bv, Shivaputra, "NOC: Design and Implementation of Hardware Network Interface With Improved Communication Reliability", 7 pages, International Journal of VLSI and Embedded Systems, IJIVES (vol. 04, Article 06116; Jun. 2013).

Yang, J., et al., Homogeneous NoC-based FOGA: The Foundation for Virtual FPGA, 10th IEEE International Conference on Computer and Information Technology (CIT 2010), Jun. 2010, pp. 62-67.

Zaman, Aanam, "Formal Verification of Circuit-Switched Network on Chip (NoC) Architectures using SPIN", Oosman Hasan, IEEE © 2014, 8 pages.

Benini, Luca, et al., "Networks on Chips: A New SoC Paradigm", IEEE Computers, SOC Designs, pp. 70-78, Copyright 2002 IEEE. 0018-9162/02.

Sethuraman, Ranga Vemuri Balasubramanian, "optiMap: A Tool for Automated Generation of NoC Architecture Using Multi-Port Routers for FPGAs", IEEE, pp. 1-6, 2006.

International Search Report and Written Opinion for PCT/US2014/060745, Jan. 21, 2015, 10 pgs.

International Search Report and Written Opinion for PCT/US2014/060879, Jan. 21, 2015, 10 pgs.

International Search Report and Written Opinion for PCT/US2014/060892, Jan. 27, 2015, 10 pgs.

International Search Report and Written Opinion for PCT/US2014/060886, Jan. 26, 2015, 10 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

International Search Report and Written Opinion for PCT/US2014/023625, Jul. 10, 2014, 9 pgs.

International Preliminary Report on Patentability for International Application No. PCT/US2013/064140, dated Apr. 14, 2015, 5 pages Office Action for Korean Patent Application No. 10-2016-7019093 dated Sep. 8, 2016, 3 pages plus 1 page English translation. KIPO, Korea.

Notice of Allowance for for Korean Patent Application No. 10-2016-7019093 dated Sep. 8, 2016, 4 pages. KIPO, Korea.

International Search Report and Written Opinion for PCT/US2014/037902, Sep. 30, 2014, 14 pgs.

Office Action for Japanese Patent Application No. 2015-535898 dated Oct. 25, 2016, 2 pages English, 2 pages untranslated copy. Japan Patent Office.

Notice of Grant for Japanese Patent Application No. 2015-535898 dated Jan. 17, 2017, 3 pages, untranslated. Japan Patent Office.

International Search Report and Written Opinion for PCT/US2014/048190, Nov. 28, 2014, 11 pgs.

Office Action for Japanese Patent Application No. 2016-516030 dated Aug. 30, 2016, 2 pages, Japan Patent Office.

Decision to Grant for Japanese Patent Application No. 2016-516030 dated Nov. 22, 2016, 6 pages, untranslated, Japan Patent Office.

\* cited by examiner

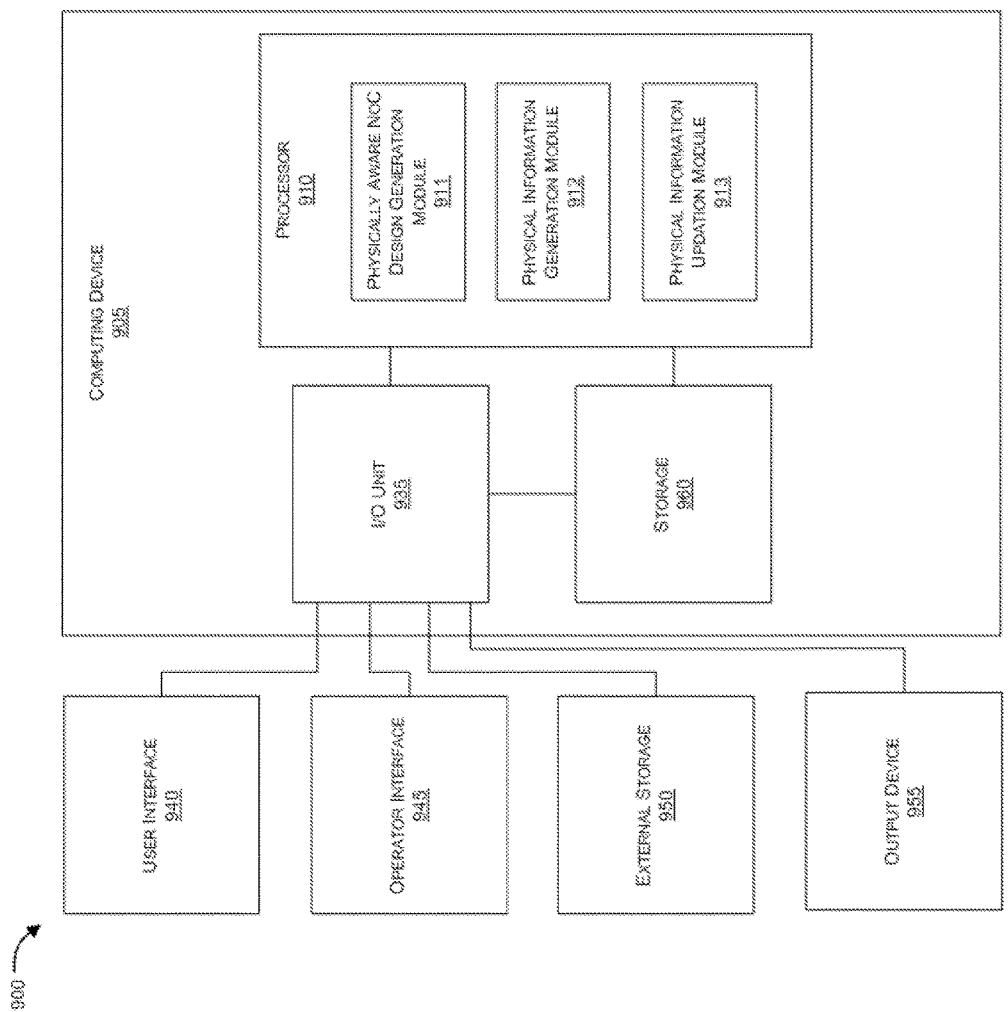

GENERATING PHYSICALLY AWARE NETWORK-ON-CHIP DESIGN FROM A PHYSICAL SYSTEM-ON-CHIP SPECIFICATION

BACKGROUND

Technical Field

Methods and example implementations described herein are directed to interconnect architecture, and more specifically, to generation of a physically aware Network on Chip (NoC) design from a physically aware System on Chip (SoC) design specification.

Related Art

The number of components on a chip is rapidly growing due to increasing levels of integration, system complexity and shrinking transistor geometry. Complex System-on-Chips (SoCs) may involve a variety of components e.g., processor cores, Digital Signal Processors (DSPs), hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may be implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. Abridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication, which thereby reduces the global average latency, as well as reduce the number of router nodes and links over which the higher bandwidth of this communication must be provisioned.

To design a SoC/NoC, a user generally provides several requirements such as number of nodes/agents/elements, positions of different agents/nodes, capacity of agents, channel size/capacity, connectivity information of channel, how different nodes/agents are connected, power profiles, voltage profile, bandwidth requirement etc. in the form of physical information of the SoC, along with SoC specification and traffic specification of SoC. Physical information of SoC, SoC specification and traffic specification may include one more restrictions or constraints of the SoC/NoC or of agents or of channels of SoC/NOC. In several cases, it is possible that one or more of these inputs are conflicting, and hence these conflicting inputs/restrictions/constraints need to be identified.

Designing a NoC that fulfills several of these requirements and incorporates a plurality of restrictions/constraints may not be possible manually. There do exist related art methods and systems for generation of NoC design for a given input specification, however these existing automation methods and systems do not automatically generate a physically aware NoC design and are also not able to generate physically aware NoC scripts/specifications.

SUMMARY

Therefore, there is a need for methods, systems, and computer readable mediums for automatic generation of physically aware NoC and physically aware NoC specification from one or a combination of physical information of SoC, SoC specification, and traffic specification of the SoC. These methods, systems, and computer readable mediums should also automatically generate a physically aware NoC specification that can be used by different Electronic Design Automation (EDA) tools and can be used to modify physical information of SoC, SoC specification, and traffic specification of SoC so as to remove conflicting constraints/restrictions.

Aspects of the present disclosure relate to methods, systems, and computer readable mediums for automatically generating physically aware NoC design, and physically aware NoC specification based on one or a combination of given SoC architectural details, physical information of SoC, traffic specification, power profile, and one or more constraints. An aspect of present disclosure provides a method for automatically generating a physically aware NoC design and physically aware NoC specification including traffic specification, power specification, and physical/location constraints etc. based on one or a combination of given SoC architectural details, physical information of the SoC, traffic specification, power profile, and one or more constraints, and can include steps of receiving input information, determining the location/position of different NoC agents, interconnecting channels, pins, I/O interfaces, physical/virtual boundaries, number of layers, size/depth/width of different channels at different times, and locating/configuring the different NoC agents, interconnecting channels, pins, I/O interfaces, physical/virtual boundaries.

In an example implementation, upon receiving the input information such as SoC architectural details, physical information of SoC, traffic specification, power profile, and one or more constraints associated with SoC, method of the present disclosure can include the step of determining position/location of different NoC agents, interconnecting channels, network elements, input/output interfaces, and pins such that once the location/position of agents, interconnecting channels, pins and input/output interfaces are determined, different power profiles and traffic profiles including routing information can be determined and assigned to different NoC agents and network elements. In an example implementation, size of channels (input channels and output channels), width/depth of channels, buffer size of agents and network elements can be determined and assigned to respective channels. In example implementations, optimal positions of the NoC agents, network elements, and their orientations and interface signals positions can be determined based on given physical information of the SoC.

In an aspect, method of the present disclosure can further include the step of generating physical information associated with one or more elements of NoC design, wherein the generated physical information can be used to augment the physical information of the SoC for further processing by EDA tools.

In an example implementation, physical information of the SoC can include, but is not limited to, details of silicon fabrication technology, SoC floor plan information, SoC wires capacity, wire positions available for the NoC usage, wire velocity, timing information of the SoC elements/agents, clock domains information, frequency domain information, input signal driver strength and output signal loads. In an example implementation, physical information of the SoC can further include one or a combination of power grid information of the SoC, voltage and power domain associated with the SoC elements/agents, and information of power domain and voltage domain available for NoC usage. In an example implementation, physical information of the SoC can also include one or more of timing information of the SoC elements/agents such as clock domains and frequencies of various agents/interfaces of the NoC, clock domains of the NoC elements and wires at various positions, timing constraints such as input and output signal delays and properties of the clock groups. In an example implementation, physical information of the SoC can include indication of SoC/NoC core area, boundary within which the NoC agents should be placed, wiring details/channels that are available for NoC at various positions, constraints relating to whether NoC channels can be placed at certain places or not, and maximum width of channels at various positions.

In an example implementation, traffic profile specification can include routing information, bandwidth requirements, width/depth of the channel at different positions and other routing information/logics. In an example implementation, power profile specification can include details of power domains and frequency domains at which different NoC agents, hardware elements, pins, I/O interfaces and channels need to operate and power/voltage values of different NoC agents, hardware elements, pins, I/O interfaces and channels at different times. Power profile specification can also include details of plurality of power profiles at which different NoC agents, blocks, or NoC may need to operate. In an example implementation, physical constrains may include one or more restrictions or limitations such as maximum width of channels, boundaries within which the NoC agents must be placed, performance requirements, maximum delay and other such restrictions.

In an example implementation, input information such as the SoC architectural details, physical information of the SoC, traffic specification, power profile and one or more constraints can be provided in form of computer readable format, such as in design exchange format (DEF) format.

In an example implementation, physical information of the SoC can include library model that can include/define timing models at different levels, driver cell information for synthesis of SoC/NoC, number of wiring layers, metals to be used for wiring, metal speed rating, and estimated time delay of SoC/NoC or estimated/allowed performance delay on each agent of SoC/NoC.

In an example implementation, optimal number of NoC layers to meet the performance requirements can be determined based on a given number of wiring layers as part of physical information of the SoC. In an example implementation, different clock speeds at which different NoC layers may operate can be determined based on given speed rating of metals.

In an example implementation, one or more constraints such as location constraints of interconnecting wires, SoC/NoC agents, traffic restriction, power limitation, among other constraints can also be considered to determine routing of the interconnecting channels of the SoC/NoC agents to help determine the NoC topology and architecture.

According to an aspect of the present disclosure, physically aware NoC design can be automatically generated using physical information of the SoC and the SoC traffic specification. In an example implementation, the physical information of the SoC and the SoC traffic specification can be used to automatically generate one or more NoC bridges, NoC routers, and NoC channels at one or more allowed SoC physical positions without violating any constraints of the SoC specification(s). In an example implementation, the generated NoC elements/agents, SoC elements/agents and channels can be interconnected in an efficient manner in such as way that the performance requirements from the SoC traffic specification are satisfied.

According to an aspect of the present disclosure, wire information, timing information, and clock information of the physical information of the SoC can be used to automatically assign clock domains and clock frequencies to the one or more elements of the NoC design. In an example implementation, the clock domains and the clock frequencies for one or more NoC elements/agent and/or one or more NoC channels can be determined automatically and be assigned to different channels and agents of the NoC based on the physical information of the SoC. In an example implementation, register stages needed/required for each of the NoC channels can be determined based on clock domain properties, clock frequencies, and wire properties of one or more NoC channels. In an example implementation, wire properties can include wire capacity, average delay, metal used, thickness etc.

In an example implementation, power and voltage information, power states, power activities of the SoC, and the SoC traffic specification can be used to automatically assign voltage domains and power domains to the one or more elements of the NoC design that meet the defined power and voltage domain constraints and reduce the overall NoC power consumption.

In an example implementation, one or more conflicts/constraint violations during the generation of physically aware NoC design can be identified and suggestions for modification of such constraints in the input information can be generated and sent as feedback information for modifying the input NoC specification.

According to one example implementation of the present disclosure, physical information associated with one or more elements of NoC design can be automatically generated in suitable computer readable formats such as RTL format, DEF format, synthesis script etc. In an example implementation, one or more traffic constraints, physical location constraints, timing constraints, physical synthesis script and power intent information of the physically aware NoC can be generated in a suitable file format that can be used by other RTL/EDA tools.

In an example implementation, generated physically aware design specifications can be augmented with the given SoC physical information to enable the backend EDA flow.

BRIEF DESCRIPTION OF THE DRAWINGS

FIG. 9 illustrates an example computer system on which example implementation can be present disclosure can be executed.

DETAILED DESCRIPTION

Figure 1A:
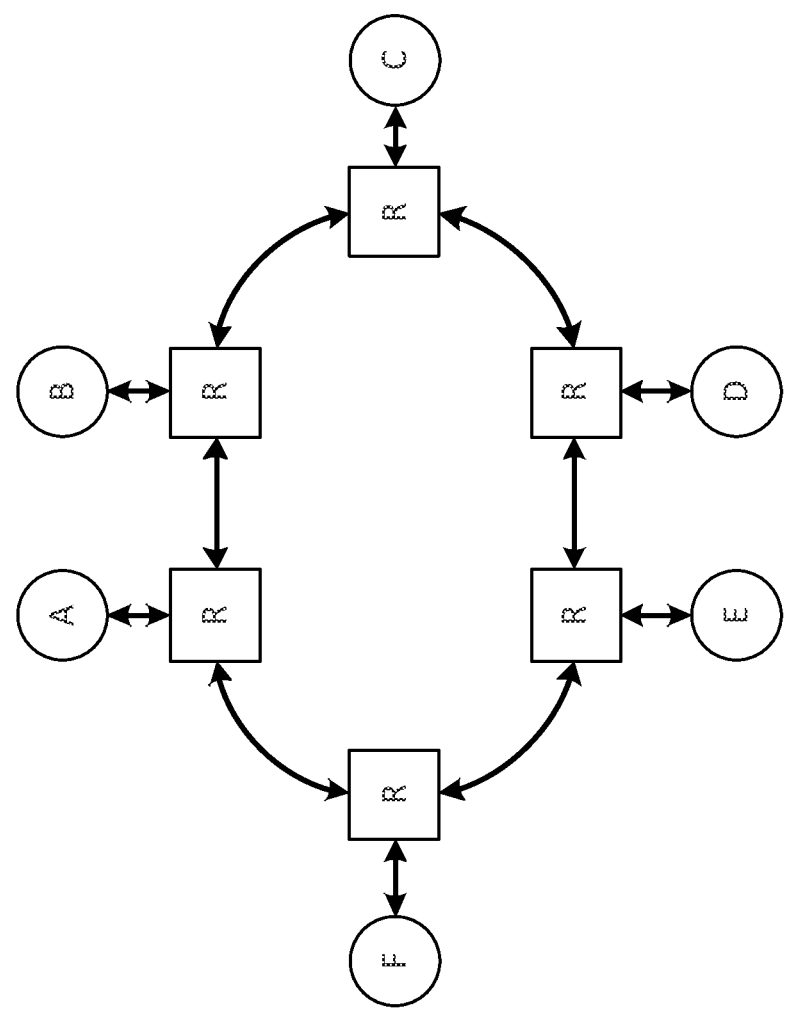
FIGS. 1(a), 1(b) 1(c) and 1(d) illustrate examples of Bidirectional ring, 2D Mesh, 2D Taurus, and 3D Mesh NoC Topologies.
Figure 1B:
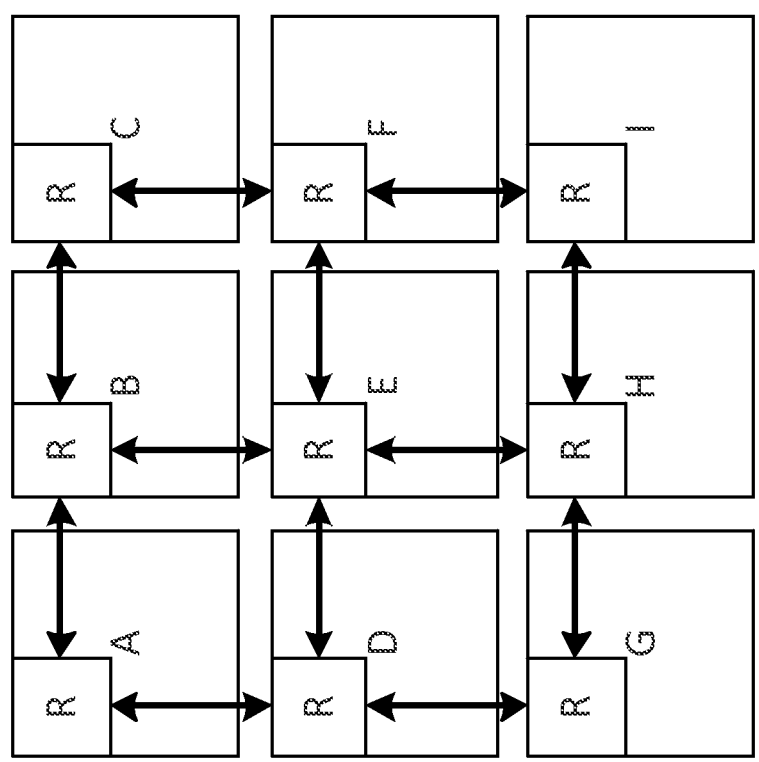
Figure 1C:
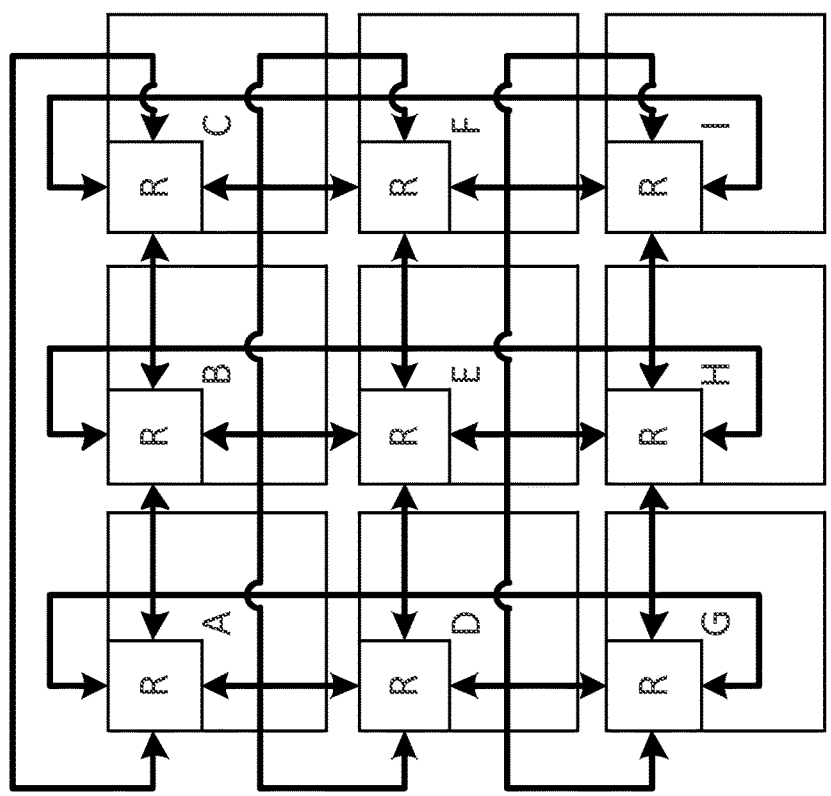
Figure 1D:
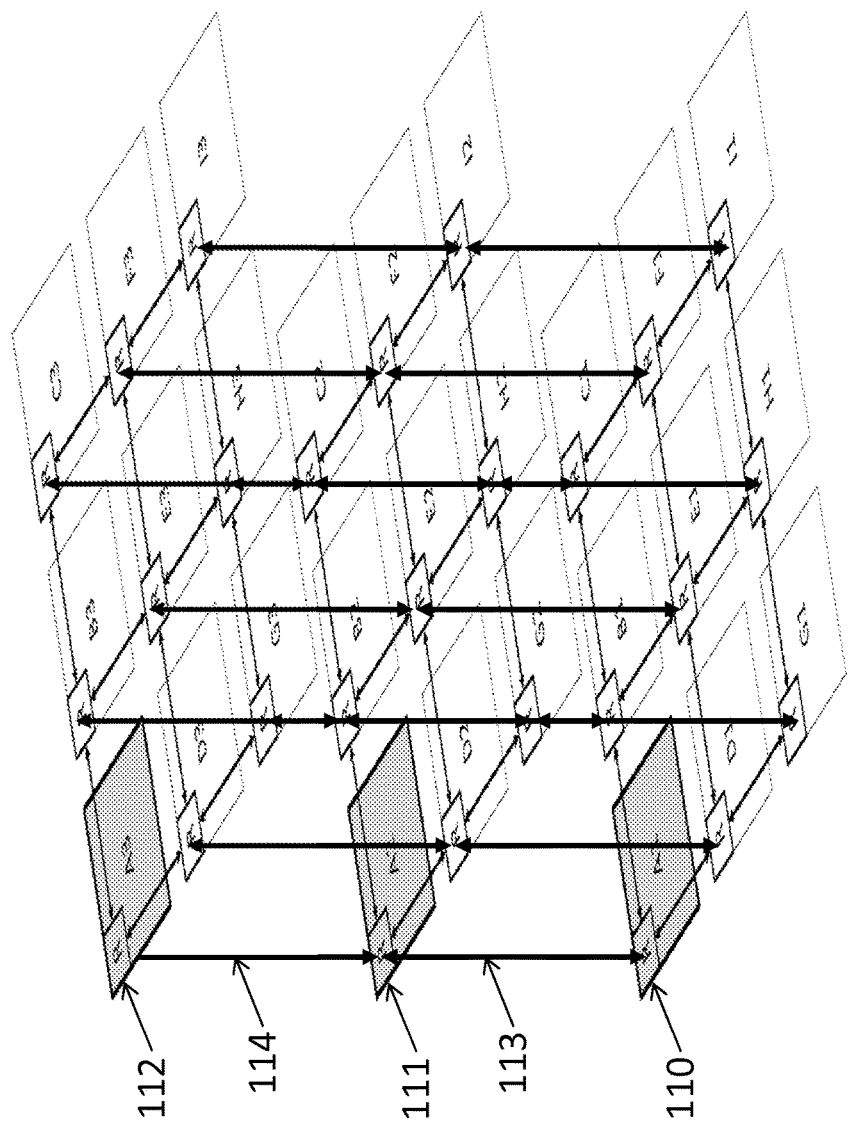
Figure 2A:
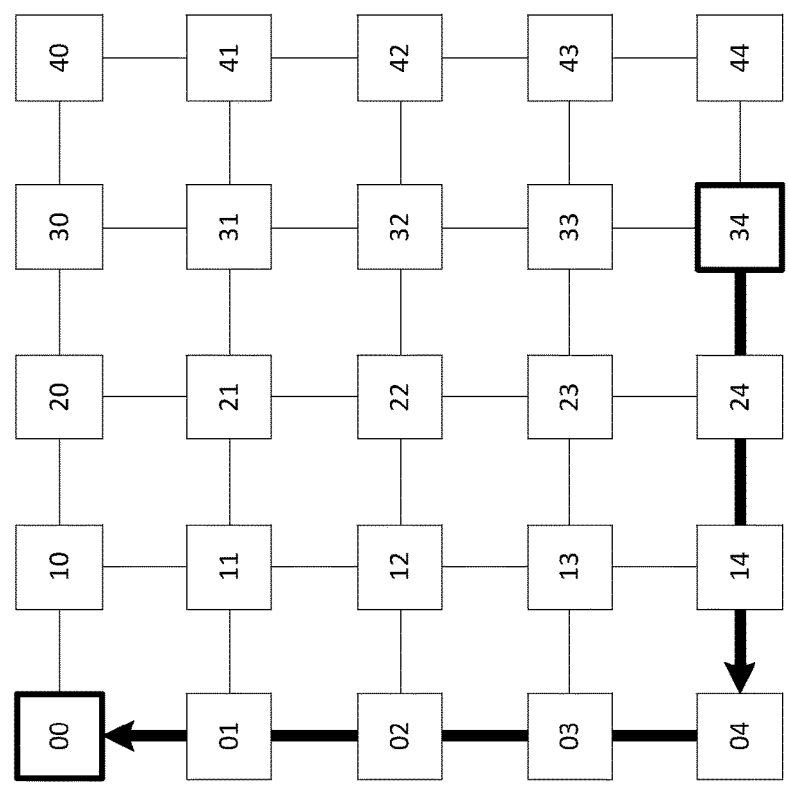
FIG. 2(a) illustrates an example of XY routing in a related art two dimensional mesh.
Figure 2B:
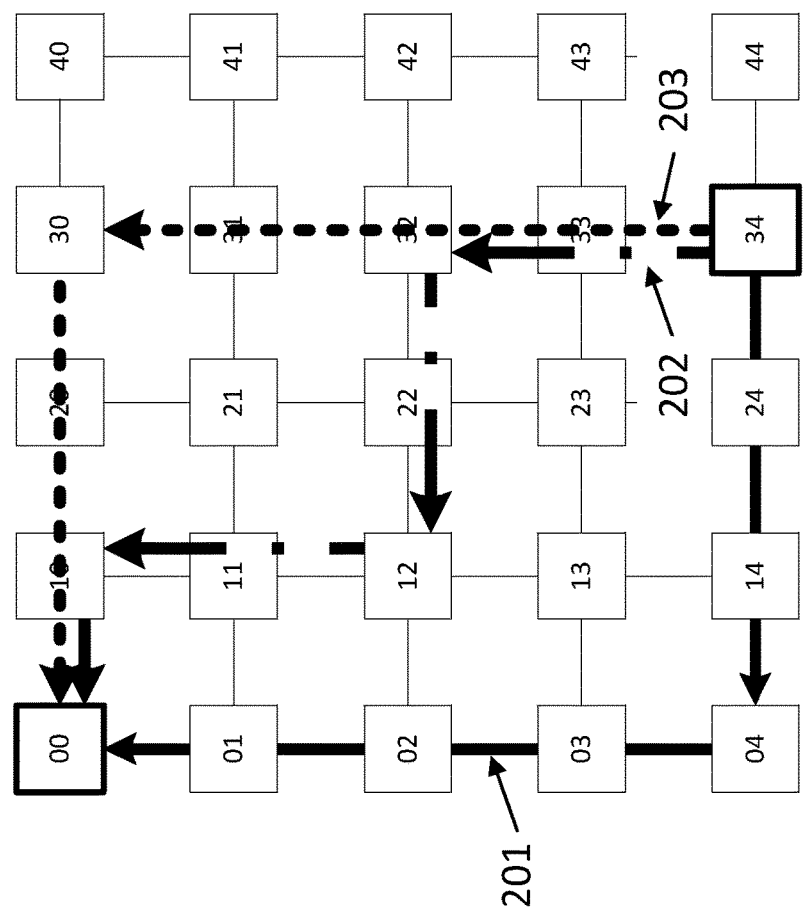
FIG. 2(b) illustrates three different routes between a source and destination nodes.
Figure 3A:
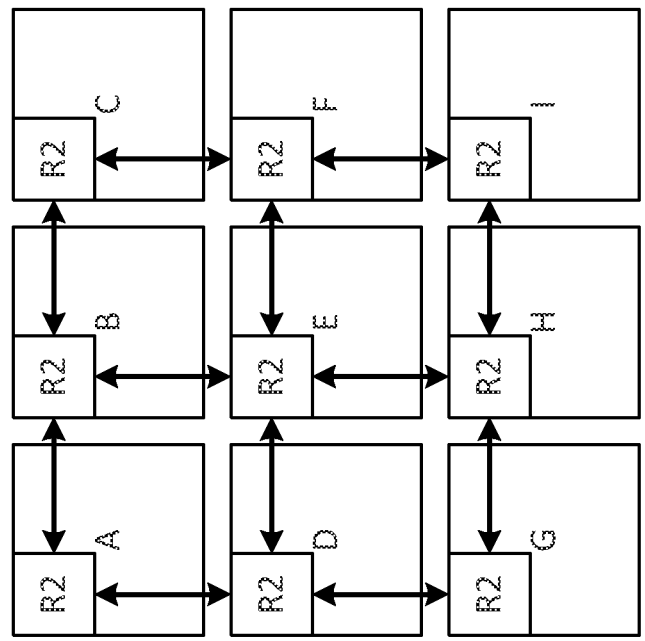
FIG. 3(a) illustrates an example of a related art two layer NoC interconnect.
Figure 3A:
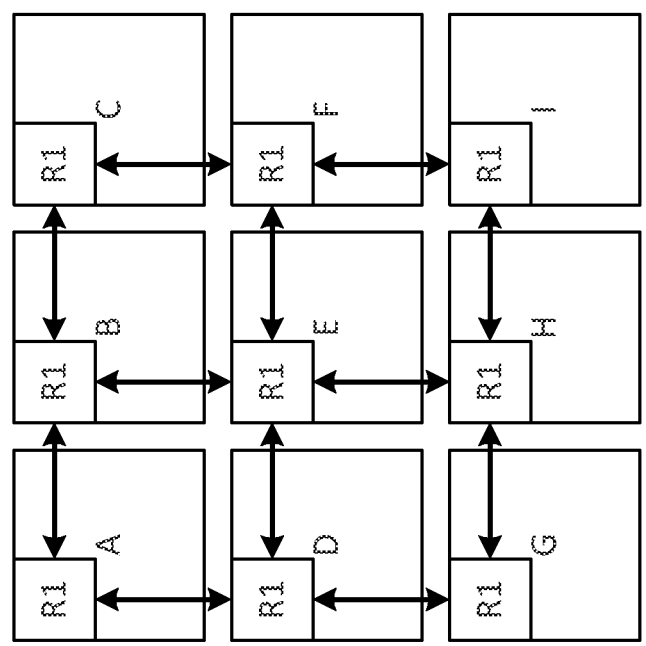
Figure 3B:
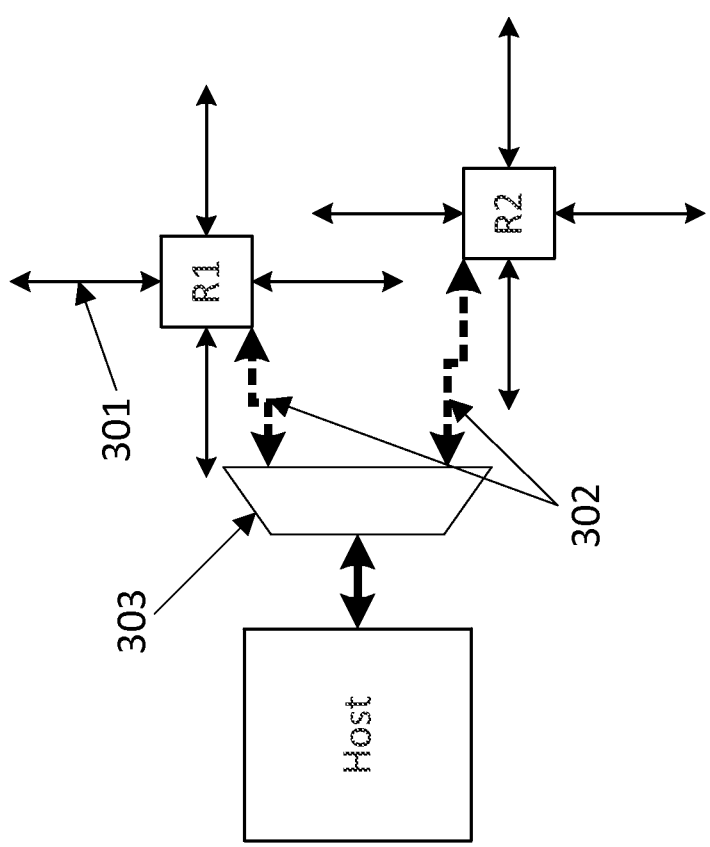
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Aspects of the present disclosure relate to methods, systems, and computer readable mediums for automatically generating physically aware NoC design, and physically aware NoC specification based on one or a combination of given SoC architectural details, physical information of SoC, traffic specification, power profile, and one or more constraints. An aspect of present disclosure provides a method for automatically generating a physically aware NoC design and physically aware NoC specification including traffic specification, power specification, and physical/location constraints etc. based on one or a combination of given SoC architectural details, physical information of the SoC, traffic specification, power profile, and one or more constraints, wherein the includes steps of receiving input information, determining the location/position of different NoC agents, interconnecting channels, pins, I/O interfaces, physical/virtual boundaries, number of layers, size/depth/width of different channels at different times, and locating/configuring the different NoC agents, interconnecting channels, pins, I/O interfaces, physical/virtual boundaries.

In an example implementation, upon receiving the input information such as SoC architectural details, physical information of SoC, traffic specification, power profile, and one or more constraints associated with SoC, method of the present disclosure can include the step of determining position/location of different NoC agents, interconnecting channels, network elements, input/output interfaces, and pins such that once the location/position of agents, interconnecting channels, pins and input/output interfaces are determined, different power profiles and traffic profiles including routing information can be determined and assigned to different NoC agents and network elements. In an example implementation, size of channels (input channels and output channels), width/depth of channels, buffer size of agents and network elements can be determined and assigned to respective channels. In example implementations, optimal positions of the NoC agents, network elements, and their orientations and interface signals positions can be determined based on given physical information of the SoC.

In an aspect, method of the present disclosure can further include the step of generating physical information associated with one or more elements of NoC design, wherein the generated physical information can be used to augment the physical information of the SoC for further processing by EDA tools.

In an example implementation, physical information of the SoC can include, but is not limited to, details of silicon fabrication technology, SoC floorplan information, SoC wires capacity, wire positions available for the NoC usage, wire velocity, timing information of the SoC elements/agents, clock domains information, frequency domain information, input signal driver strength and output signal loads. In an example implementation, physical information of the SoC can further include one or a combination of power grid information of the SoC, voltage and power domain associated with the SoC elements/agents, and information of power domain and voltage domain available for NoC usage. In an example implementation, physical information of the SoC can also include one or more of timing information of the SoC elements/agents such as clock domains and frequencies of various agents/interfaces of the NoC, clock domains of the NoC elements and wires at various positions, timing constraints such as input and output signal delays and properties of the clock groups. In an example implementation, physical information of the SoC can include indication of SoC/NoC core area, boundary within which the NoC agents should be placed, wiring details/channels that are available for NoC at various positions, constraints relating to whether NoC channels can be placed at certain places or not, and maximum width of channels at various positions.

In an example implementation, traffic profile specification can include routing information, bandwidth requirements, width/depth of the channel at different positions and other routing information/logics. In an example implementation, power profile specification can include details of power domains and frequency domains at which different NoC agents, hardware elements, pins, I/O interfaces and channels need to operate and power/voltage values of different NoC agents, hardware elements, pins, I/O interfaces and channels at different times. Power profile specification can also include details of plurality of power profiles at which different NoC agents, blocks, or NoC may need to operate. In an example implementation, physical constrains may include one or more restrictions or limitations such as maximum width of channels, boundaries within which the NoC agents must be placed, performance requirements, maximum delay and other such restrictions.

In an example implementation, input information such as the SoC architectural details, physical information of the SoC, traffic specification, power profile and one or more constraints can be provided in form of computer readable format, such as in design exchange format (DEF) format.

In an example implementation, physical information of the SoC can include library model that can include/define timing models at different levels, driver cell information for synthesis of SoC/NoC, number of wiring layers, metals to be used for wiring, metal speed rating, and estimated time delay of SoC/NoC or estimated/allowed performance delay on each agent of SoC/NoC.

In an example implementation, optimal number of NoC layers to meet the performance requirements can be determined based on a given number of wiring layers as part of physical information of the SoC. In an example implementation, different clock speeds at which different NoC layers may operate can be determined based on given speed rating of metals.

In an example implementation, one or more constraints such as location constraints of interconnecting wires, SoC/NoC agents, traffic restriction, power limitation, among other constraints can also be considered to determine routing of the interconnecting channels of the SoC/NoC agents to help determine the NoC topology and architecture.

According to an aspect of the present disclosure, a physically aware NoC design can be automatically generated using physical information of the SoC and the SoC traffic specification. In an example implementation, the physical information of the SoC and the SoC traffic specification can be used to automatically generate one or more NoC bridges, NoC routers, and NoC channels at one or more allowed SoC physical positions without violating any constraints of the SoC specification(s). In an example implementation, the generated NoC elements/agents, SoC elements/agents and channels can be interconnected in an efficient manner in such as way that the performance requirements from the SoC traffic specification are satisfied.

According to an aspect of the present disclosure, wire information, timing information, and clock information of the physical information of the SoC can be used to automatically assign clock domains and clock frequencies to the one or more elements of the NoC design. In an example implementation, the clock domains and the clock frequencies for one or more NoC elements/agent and/or one or more NoC channels can be determined automatically and be assigned to different channels and agents of the NoC based on the physical information of the SoC. In an example implementation, register stages needed/required for each of the NoC channels can be determined based on clock domain properties, clock frequencies, and wire properties of one or more NoC channels. In an example implementation, wire properties can include wire capacity, average delay, metal used, proposed thickness etc.

In an example implementation, power and voltage information, power states, power activities of the SoC, and the SoC traffic specification can be used to automatically assign voltage domains and power domains to the one or more elements of the NoC design that meet the defined power and voltage domain constraints and reduce the overall NoC power consumption.

In an example implementation, one or more conflicts/constraint violations during the generation of physically aware NoC design can be identified and suggestions for modification of such constraints in the input information can be generated and sent as feedback information for modifying the input NoC specification.

According to one example implementation of the present disclosure, physical information associated with the one or more elements of NoC design can be automatically generated in suitable computer readable formats such as RTL format, DEF format, synthesis script etc. In an example implementation, one or more traffic constraints, physical location constraints, timing constraints, physical synthesis script and power intent information of the physically aware NoC can be generated in a suitable file format that can be used by other RTL/EDA tools.

In an example implementation, generated physically aware design specifications can be augmented with the given SoC physical information to enable the backend EDA flow.

Figure 4A:
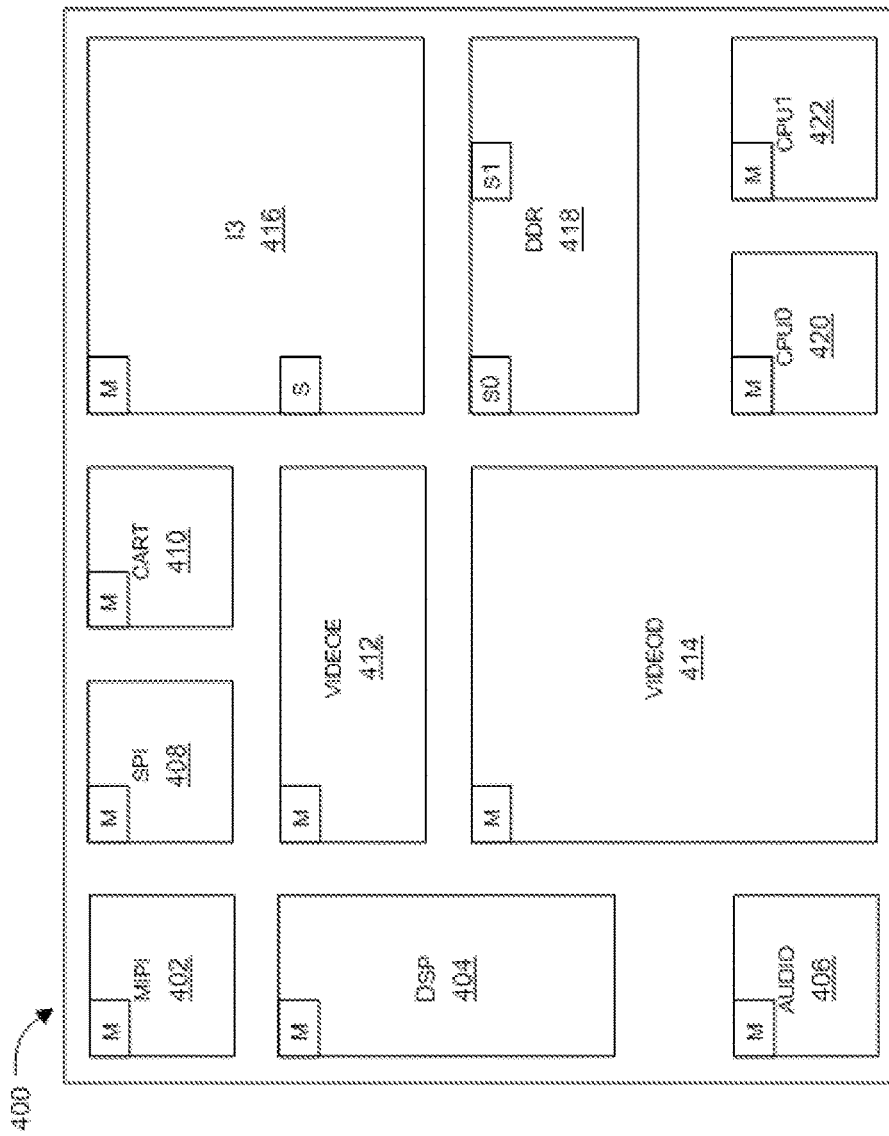
FIG. 4(a) illustrates an example floor plan of SoC that can be submitted as part of physical information of SoC to automatically generate NoC design in accordance with an example implementation of the present disclosure.

FIG. 4(a) illustrates an example floor plan of SoC that can be submitted as part of physical information of SoC to automatically generate NoC design in accordance with an example implementation of the present disclosure. As shown in the FIG. 4(a), floor plan 400 can include an indication of different SoC elements that need to be incorporated in the NoC, their tentative positions, capacities, space constraints, size constraints, among other like parameters. Example floor plan 400 can include different agents/elements such as mobile industry processor interface (MIPI) 402, digital signal processor (DSP) 404, audio processing unit 406, serial peripheral interface (SPI) 408, CART 410, video encoder (VIDEOE) 412, video decoder (VIDEOD) 412, I3, memory DDR 418, processing units CPU0 420 and CPU1 422, and their desired positioning. In addition, the floor plan information can also include shape and size information of different agents/elements of the SoC. The agents listed in floorplan 400 are examples of types of agents that can be used, and is not limited to the agents illustrated. Other agents with various sizes may be used depending on the desired implementation.

In an example implementation, SoC floor plan information can include information about location of different NoC elements/agents, their capacities, power profiles, power/current status, and connectivity information. Floor plan of the SoC can also include plurality of details such as positions of the SoC/NoC elements/agents, shapes of the SoC/NoC elements/agents, size of SoC/NoC elements/agents, aspect ratios, locations of different pins and blocks of the SoC. In an example implementation, information associated with the floor plan 400 can be provided at top level, hierarchical level, agent level, group level or voltage domain level. In an example implementation, floor plan and other physical information of the SoC can be provided as DEF files.

Further, agents can be used interchangeably to represent any hardware element such as CPU, GPU, different ports, and different interfaces. Similarly, hardware elements can be used interchangeably to collectively refer different routers, switches, and other network elements.

In another example implementation, the number of agents/elements, their positions, sizes and other properties of SoC/NoC can be defined through a user interface. Such a user interface can allow a user to draw/indicate positions of different agents, their sizes, and other associated properties. The physical information incorporating the floor plan can be received as input for automatically generating the NoC design through the input interface that may have option to directly upload the floor plan written in a scripting language or as a DEF file that defines the floor plan in detail. In an example implementation, the input interface allows a user to draw the floor plan with help of EDA tools. In an example implementation, information associated with the floor plan can be provided at top level, hierarchical level, agent level, group level, or at the voltage domain level. In an example implementation, location/position of each agent can be indicated by storing the location/position in form of coordinates. In an example implementation, the floor plan and other physical information of the SoC can be provided as DEF files. In an example implementation, SoC floor plan information can include information about location of different NoC elements/agents, their capacities, power profiles, power/current status, and connectivity information. In other example implementation, floor plan can include details of blocks, aspect ratios of each block and/or individual agents, locations of pins, positions of SoC/NoC agents, shapes of SoC/NoC agents, sizes of SoC/NoC agents, routing paths, connectivity information, firing channels, capacity of different agents and channels, wire delays, minimum and maximum allowed distance between different agents and overall size of the SoC. Physical information of the SoC can clearly indicate location of each firing channel, wire velocity of different interconnecting wires, and possible delay/drops in communication. Physical information of the SoC can include one or more restrictions/conditions and other properties of SoC in addition to the floor plan.

Figure 4B:
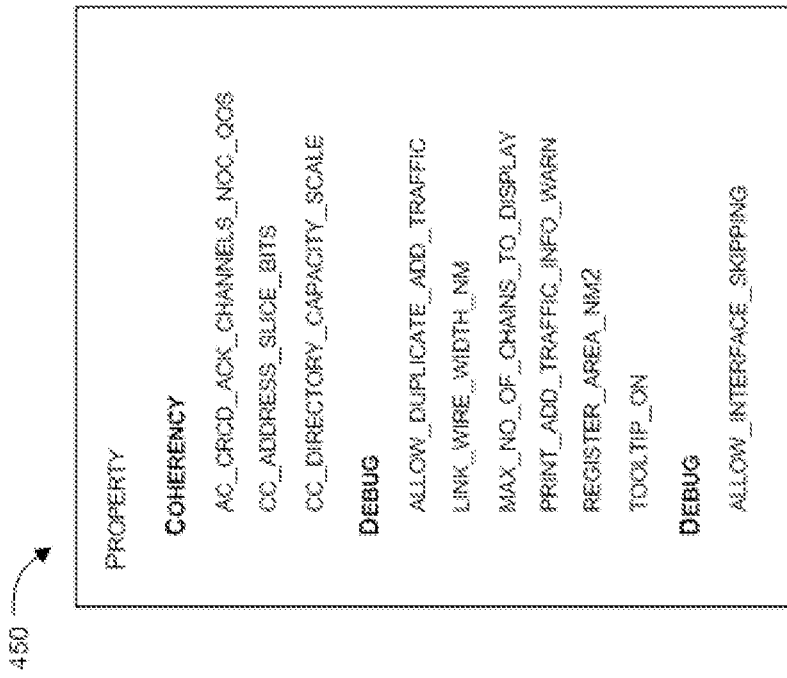
FIG. 4(b) illustrates properties of SoC incorporated as part of physical information of SoC in accordance with an example implementation of the present disclosure.

FIG. 4(b) illustrates properties of SoC that are incorporated as part of the physical information of the SoC in accordance with an example implementation of the present disclosure. As shown in FIG. 4(b), different properties of the SoC may include coherence properties and debug properties, which can be defined by a user. In an example implementation, different debug properties such as
ALLOW_DUPLICATE_ADD_TRAFFIC,
LINK_WIRE_WIDTH_NM,
MAX_NO_OF_CHAINS_TO_DISPLAY,
PRINT_ADD_TRAFFIC_INFO_WARN, REGISTER_AREA_NM2, and
TOOLTIP_ON,
among others can be specified in the physical information of the SoC. In an example implementation, power properties, frequency domain information of individual agents and channels can be specified. As shown in FIG. 4(b), debug information ALLOW_DUPLICATE_ADD_TRAFFIC may specify duplicate traffic that can be allowed through any channel or agent, and LINK_WIRE_WIDTH_NM indicates wire thickness/width and length of wires connecting different agents/elements. Similarly, other debug properties of the SoC can be defined through the input interface, and can be provided as part of the physical information of the SoC. As explain earlier, physical information of the SoC can include details of the silicon fabrication technology, SoC wires capacity, and wire positions available for the NoC usage, and properties of the SoC wires such as wire velocity.

In an example implementation, physical information of the SoC can also include one or more of timing information of the SoC elements/agents such as clock domains and frequencies of various agent interfaces to the NoC, clock domains of the NoC elements and wires at various positions, timing constraints such as input and output signal delay and properties of the clock groups, input signal driver strength, and output signal loading, among other attributes/parameters. In an example implementation, the physical information of the SoC can further include power grid information of the SoC, voltage and power domain associated with the SoC elements/agents and information of power domain and voltage domain available for NoC usage.

In an example implementation, floor plan and other physical information of the SoC can also indicate power domain, frequency domain, and clock frequencies of different agents and channels, which may be used for grouping the agents based on their power domain and frequency domain information. For instance, agents operating at a particular frequency domain or power domain can be grouped together and can be placed in close proximity.

In an example implementation, library model containing timing models at different levels, driver cell information for synthesis of SoC/NoC, and estimated time delay of the SoC/NoC or estimated/allowed performance delay on each agent of SoC/NoC can also be provided as part of the physical information of the SoC.

One can appreciate that physical information of the SoC can be provided as input in the form of a computer readable file format for automatically generating a NoC design and NoC design specification.

Figure 4C:
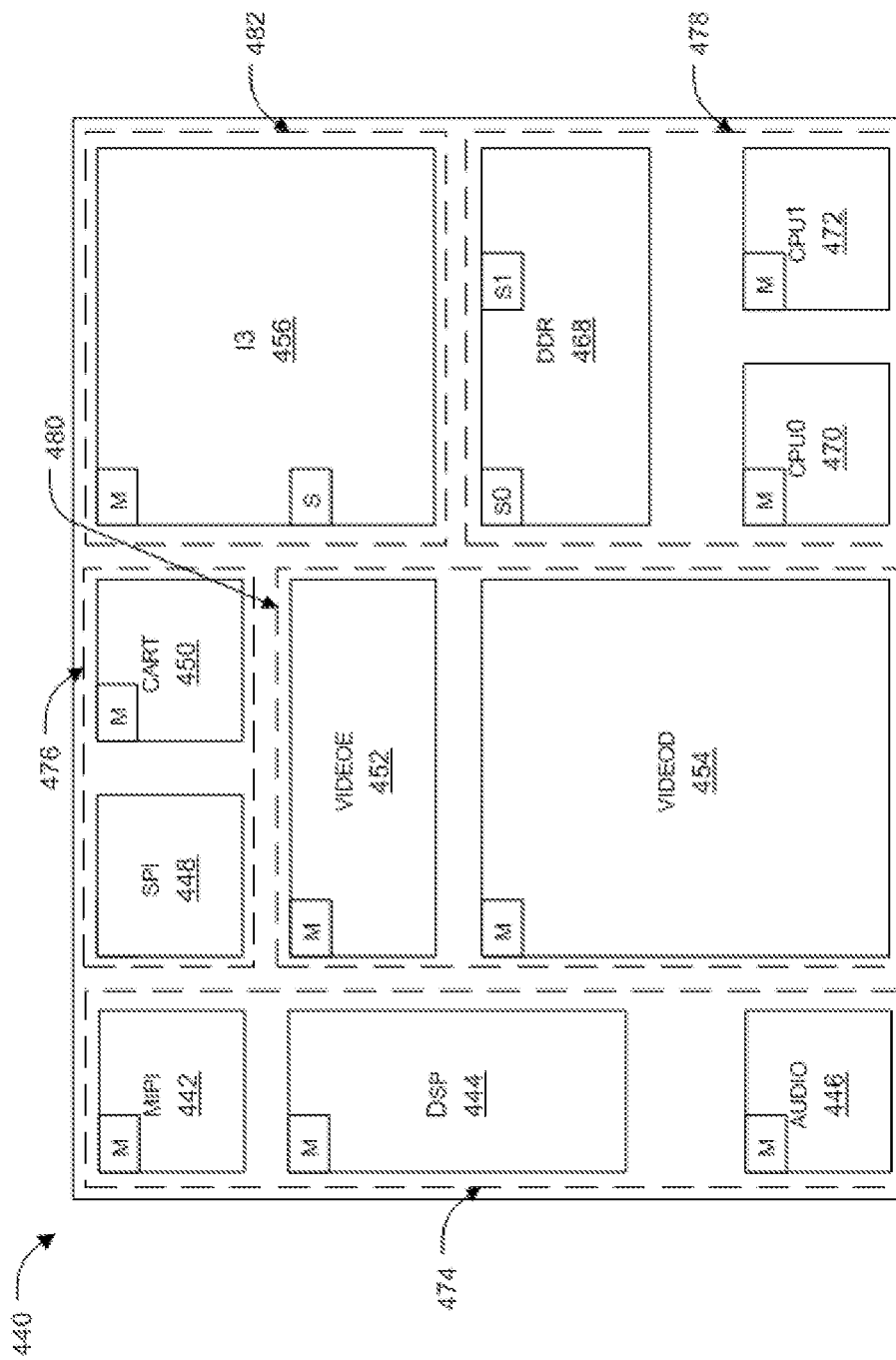
FIG. 4(c) illustrates an example floor plan indicating possible grouping of agents in accordance with an example implementation of the present disclosure.

FIG. 4(c) illustrates an example floor plan indicating possible grouping of agents in accordance with an example implementation of the present disclosure. In an example implementation, floor plan 440 can be divided into different groups/clocks, namely block 474, block 476, block 478, block 480, and block 482. In example implementation, these blocks can be created based on certain similarity such as operating power domain, operating frequency domain, clock speed, frequency of communication, among other parameters. For instance, a plurality of agents such as MIPI 442, DSP 44, and AUDIO 446 can be grouped together as they may be operating at power domain 1 (PD1) to form a group/block 474, and another set of agents such as SPI 448 and CART 450 can be grouped together as they may be operating at power domain 2 (PD2) to form a group/block 476. Similarly, agents CPU0 470 and CPU1 472 can be grouped together to form a group/block 478.

In another example implementation, grouping and/or block information of the SoC can be provided by the user as part of the physical information of the SoC or can be automatically generated based on given physical information of the SoC and other SoC specification. In an example implementation, a plurality of agents can be grouped together based on power domain, frequency domain, clock frequency, position/location indication/restriction of agents, and maximum allowed length of channels. In an example implementation, once the blocks have been defined, their associated parameters or constraints can be defined by the user or can be automatically generated. For example, aspect ratios of each block 474, block 476, block 478, block 480, and block 482 can be individually defined by the user. Locations of different pins or cross-domain interfaces can similarly be defined.

According to an example implementation, upon receiving the physical information of the SoC, one or more constraints, SoC specification, power profile, and profile of the SoC, the NoC design can be automatically generated. In an example implementation, location of the plurality of agents and connecting wires/channels can be determined based on the given input physical information of the SoC, one or more constraints, SoC specification and power profile and profile of SoC. Plurality of agents can be strategically placed together to form a group/block based on similarity of the properties of agents. Once the location/position of the NoC agents is determined, different agents can be configured accordingly. For example, power profile and frequency profile can be assigned to different agents.

Figure 5:
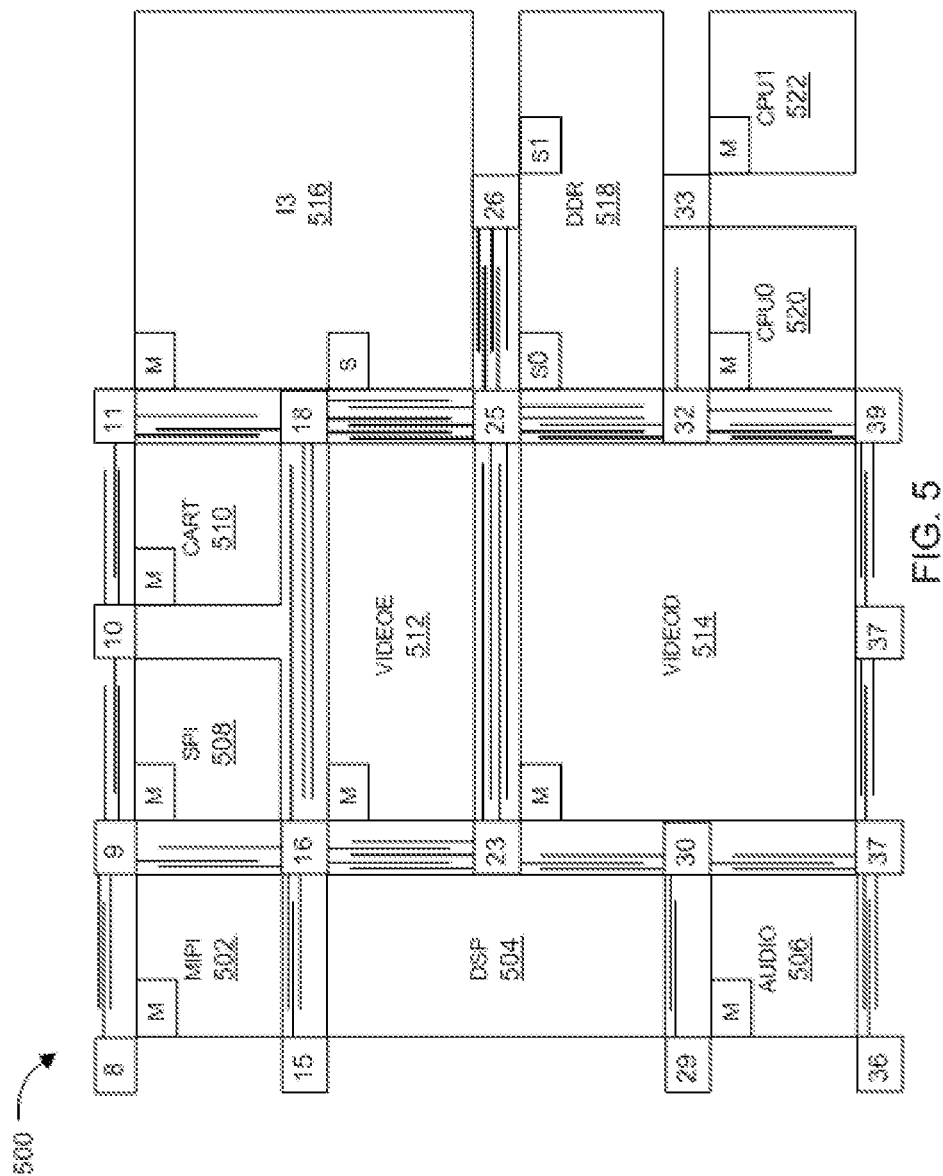
FIG. 5 illustrates an example physically aware NoC design generated in accordance with an example implementation of the present disclosure.

FIG. 5 illustrates an example physically aware NoC design generated in accordance with an example implementation of the present disclosure. As shown on the FIG. 5, different agents can be placed at the required location and can be interconnected through routers and other agents. One can appreciate that one or more processing elements such as MIPI 502, DSP 504, AUDIO 506, SPI 508, CART 510, VIDEOE 512, VIDEOD 514, I3 516, DDR 58, CPU0 520, and CPU1 522, collectively and interchangeably referred as NoC agents can be interconnected through routers 8, 9, 10, 11, 15, 16, 18, 23, 25, 26, 29, 30, 32, 33, 36, 37, 38 and 39. Based on the given physical information of the SoC, one or more constraints, SoC specification, power profile and profile of the SoC, physically aware NoC design can be automatically generated. Upon receiving the input information such as SoC architectural details, physical information of the SoC, traffic specification, power profile, and one or more constraints associated with the SoC, method of the present disclosure can determine position/location of the different NoC agents, interconnecting channels, network elements, input/output interfaces, and pins. Once the locations/positions of the agents, interconnecting channels, pins, and input/output interfaces are determined, different power profiles and traffic profiles, including routing information, can be determined and assigned to the different NoC agents and network elements. In an example implementation, size of channels (input channels and output channels), width/depth of the channels, buffer size of the agents, and network elements can be determined and assigned to the respective channels. In example implementation, optimal position of the NoC agents, network elements, and their orientations and interface signals positions can be determined based on given physical information of the SoC.

In an example implementation, the location of plurality of agents and network elements, such as routers, and corresponding connecting wires/channels can be determined based on the given physical information of SoC, one or more constraints, SoC specification and power profile, and profile of the SoC. Although in the present disclosure, physical positions of the agents of the physically aware NoC 500 are similar to those of the agents of SoC 400, it is possible in another implementation that the locations/positions of the agents change due to conflicting input specification and/or conflicting constraints/limitations.

In an example implementation, a plurality of agents can be strategically placed together to form a group/block based on similarity of the properties of the agents. In an example implementation, locations/positions of different agents can be determined based on the given floor plan such that once the location/position of the NoC agents is determined, different agents can be configured accordingly. For example, power and frequency profiles of agents can be configured, width of channels and size of buffers can be assigned, and different ports/pins can be accordingly configured. Right clock domain, frequency domain, power domain, power state, and voltage state can be assigned to different agents of the NoC 500. Clock at which different agents of the NoC 500 need to operate, frequency at which different agents of the NoC need to operate at different times can also be assigned. In an example implementation, width/length of wire/channel, metal to be used for different wires/channels of the NoC 500 can be determined based on the given physical information, traffic profile and SoC specification. The physically aware NoC 500 may also have agents/blocks operating different clocks and supporting both agents/blocks that are clock synchronous and asynchronous. In an example implementation, different NoC layers may be clocked at different speeds based on the given speed rating of the metal layers. In an example implementation, different agents of the NoC can be designed differently. For instance, if there are two metal layers and one is 2 times faster than the other, the NoC can include two layers and one layer may be clocked at 2 times higher frequency than the other. Alternatively, both the layers may clock at the same speed but one layer (the faster metal layer one) may use fewer pipeline registering stages to meet the same clock frequency as that of the other NoC layer.

In an example implementation, based on a given power profile information, power domains for different NoC agents can be defined, and isolation cells can be placed at the power domain crossing boundary. In an example implementation, the number of register stages needed at each channel can be determined for the NoC 500 and can be included in the NoC specification.

In an example implementation, after generating the physically aware NoC 500, a physically aware NoC specification, power profile specification, traffic profile specification and one or more constraints/limitations of the NoC can be automatically be generated. The NoC specification can include information such as the kind of drivers that are driving different input pins, capacity/maximum load that the input and pins can support, velocity of wires, estimated delay of wires, and pipe line stages. In an example implementation, the traffic profile specification can include capacity of each channel, coordinate of each channel, and routing logics.

In an example implementation, power profile of the NoC can include power intent information, power state information, current values of different agents and channel at different times. In an example implementation, power profile of the NoC 500 can be written in a Common Power Format (CPF) file format or in another suitable format that can be used by other EDA tools. Power profile information can include details of "Always ON" agents, retention requirements and/or retention logics and/or isolation cells, and so on.

In an example implementation, one or more constraints related to location/position of agents and/or channels, timing, clock speed, power domain, frequency domain and capacity/size of different pins/interfaces can be determined. In different example implementations, one or more of these constraints can be defined at different levels such as at overall NoC level, hierarchical levels, bridge boundary or router boundary.

In an example implementation, one or more conflicting constraints/restriction included in the SoC specification or physical information of SoC, and other input information can be determined, and a feedback incorporating suggestions to be resolved such as conflicts can be generated for modifying the relevant input specifications.

Figure 6:
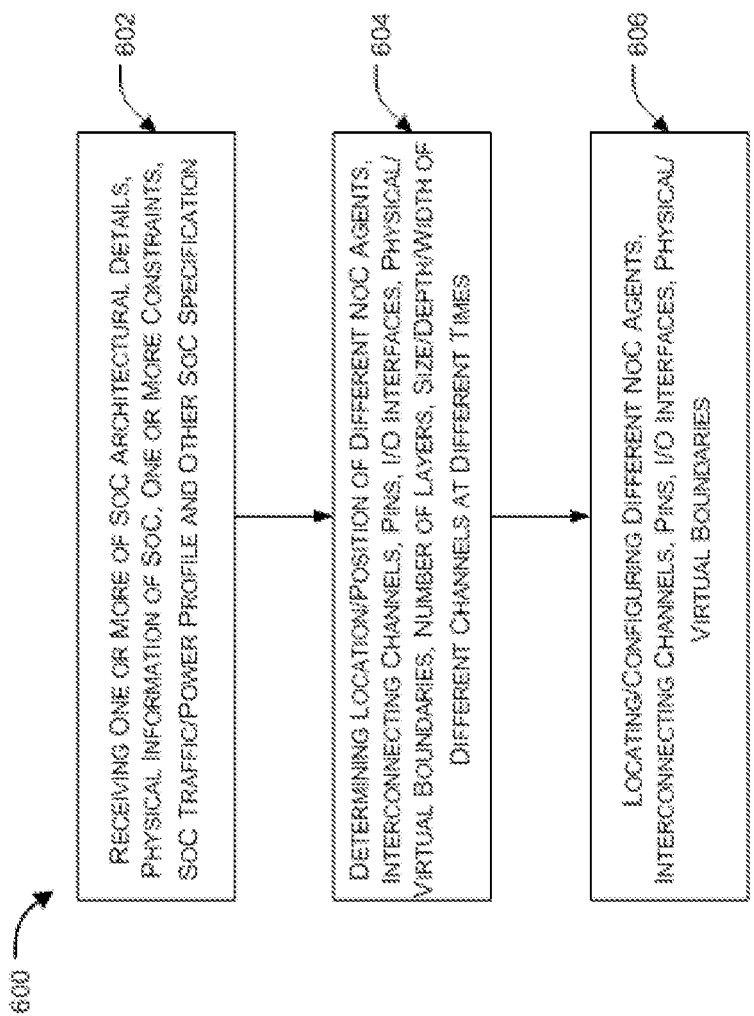
FIG. 6 illustrates an example flow diagram for generating a physically aware NoC design, physically aware NoC specification, and one or more constraints in accordance with an example implementation of the present disclosure.

FIG. 6 illustrates an example flow diagram 600 for a method of generating physically aware NoC design, physically aware NoC specification and one or more constraints in accordance with an example implementation of the present disclosure. The present method 600 can include the steps of receiving input information, determining location/position of different NoC agents, interconnecting channels, pins, I/O interfaces, physical/virtual boundaries, number of layers, size/depth/width of different channels at different time, and locating/configuring the different NoC agents, interconnecting channels, pins, I/O interfaces, physical/virtual boundaries.

At 602, the method can include receiving one or a combination of SoC architectural details, physical information, one or more constraints, SoC traffic/power profile, and other SoC specification, and at 604, the method can include determining the location/position of different NoC agents, interconnecting channels, pins, I/O interfaces, physical/virtual boundaries, number of layers, size/depth/width of different channels at different time. At 606, method the present disclosure can further include the step of locating/configuring the different NoC agents, interconnecting channels, pins, I/O interfaces, and physical/virtual boundaries for automatically generating the physically aware NoC design.

In an example implementation, based on the given input information such as SoC architectural details, physical information, one or more constraints, SoC traffic/power profile and other SoC specification, physically aware NoC design and physically aware NoC specification can be automatically generated.

In an example implementation, physical information of the SoC can include details of one or a combination of silicon fabrication technology, SoC floorplan information, SoC wire capacity, wire positions available for the NoC usage, wire velocity, timing information of the SoC elements/agents, clock domain information, frequency domain information, input signal driver strength and output signal loading. In an example implementation, physical information of the SoC can further include power grid information of the SoC, voltage and power domain associated with the SoC elements/agents and information of power domain and voltage domain available for NoC usage.

In an example implementation, SoC floor plan information can include information about location of different NoC elements/agents, their capacities, power profiles, power/current status and connectivity information. Floor plan of the SoC can further include other details such as positions/shapes/sizes/aspect ratios of the SoC/NoC agents, location of different pins and blocks of the SoC. In an example implementation, information associated with floor plan can be provided at top level, hierarchical level, agent level, group level, or voltage domain level. In an example implementation, floor plan and other physical information of the SoC can be provided as DEF files.

In an example implementation, physical information of SoC also include details on the number of wiring layers that may be used to determine the optimal number of NoC layers that may be used to meet the performance requirements. Furthermore, speed rating of the metal layers may be included as part of physical information of SoC, based on which the NoC layers may be clocked at different speeds and different NoC layers may be designed differently.

In an example implementation, physical information of the SoC agents, their positions, shapes and sizes, and the positions of their interconnect interfaces can be used to determine positions of the NoC bridges & their interface signals. The physical information of various SoC agents can also be used for determining optimal positions of the routers and their orientations and interface signals. Further based on the positions of the SoC and NoC elements, NoC channel wires of appropriate capacity can be allocated and connected.

In an example implementation, one or more constraints such as location constraints of interconnecting wires, SoC/NoC agents, traffic restriction, power limitation etc. can also be considered to determine routing of interconnection of SoC/NoC agents and hence to determine the NoC topology and architecture.

According to an aspect of the present disclosure, physically aware NoC design can be automatically generated using the physical information of SoC and SoC traffic specification. In an example implementation, physical information of the SoC and the SoC traffic specification can be used to automatically generate one or more NoC bridges, one or more NoC routers, and one or more NoC channels at an allowed SoC physical position without violating any constraints of the SoC specification. In an example implementation, generated NoC elements/agents, SoC elements/agents and channels can be interconnected in efficient manner in such as way that performance requirement from the SoC traffic specification are satisfied.

According to an aspect of the present disclosure, wire information, timing information and clock information of the physical information of the SoC can be used to automatically assign clock domains and clock frequencies to the one or more elements of the NoC design. In an example implementation, clock domains and clock frequencies for one or more NoC elements/agents and/or one or more NoC channels can be determined automatically and be assigned to different channels and agents of the NoC based on the physical information of the SoC. In an example implementation, register stages needed/required for each of the NoC channels can be determined based on clock domain properties, clock frequency and wire properties of one or more NoC channels. In an example implementation, wire properties can include wire capacity, average delay, metal used, proposed thickness, among other like attributes.

In an example implementation, power and voltage information, power states, power activities of the physical information of the SoC, and the SoC traffic specification can be used to automatically assign voltage domains and power domains to the one or more elements of the NoC design that meet power domain and voltage domains constraints, reducing the overall NoC power consumption.

In an example implementation, one or more conflicts/constraint violations during the generation of physically aware NoC design can be identified and a suggestion for modification of such constrains in the SoC specification can be generated and sent as feedback information for modifying the input NoC specification.

According to one example implementation of the present disclosure, physical information associated with the one or more elements of NoC design can be automatically generated in suitable computer readable formats such as RTL files, DEF files, synthesis script etc. In an example implementation, one or more traffic constraints, physical location constraints, timing constraints, physical synthesis script and power intent information of the physically aware NoC can be generated in a suitable file format that can be used by other RTL/EDA tools.

Figure 7:
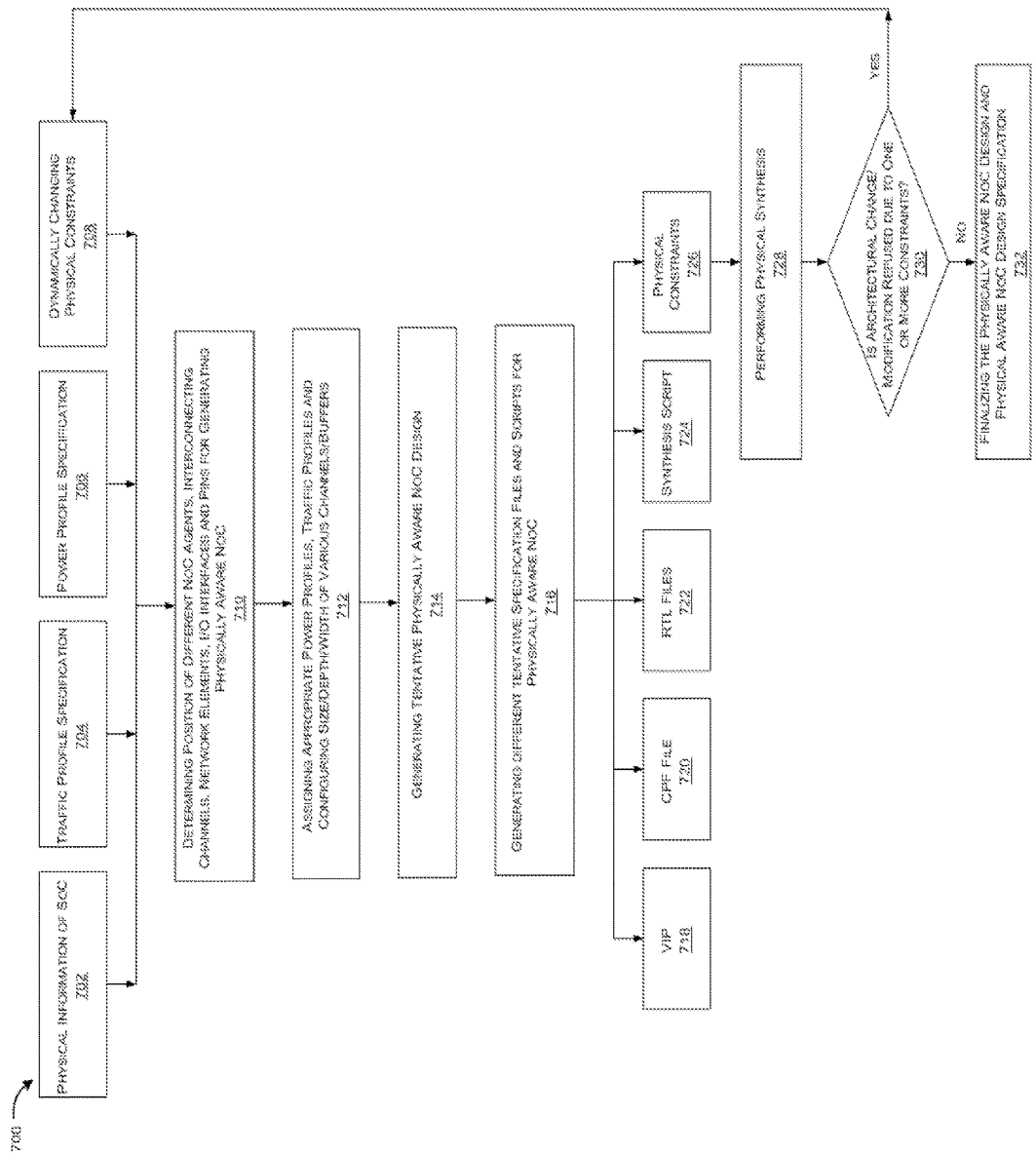
FIG. 7 illustrates an example bock diagram of a method for generating a physically aware NoC design in accordance with an example implementation of the present disclosure.

FIG. 7 illustrates a bock diagram of the method of the present disclosure that receives a plurality of input information associated with SoC, and automatically generates physically aware NoC design, NoC specification, and suggestions for modifying the input information in accordance with an example implementation of the present disclosure. As shown in the figure, input information associated with the SoC may include physical information of the SoC 702, traffic profile specification 704, power profile specification 706, and dynamically changing physical constraints 708.

In an example implementation, physical information of the SoC 702 can include one or a combination of indication of SoC/NoC core area, boundary within which the NoC agents should be placed, wiring details/channels available for NoC at various positions, constraints relating to whether NoC channels can be placed at certain places or not, and allowed maximum width of channels at various positions, among other like parameters. In an example implementation, traffic profile specification 704 may include routing information, bandwidth requirements, width/depth of the channel at different position and other routing information/logics. In an example implementation, power profile specification 706 can include details of power and frequency domain at which different NoC agents, hardware elements, pins, I/O interfaces and channels need to operate and power or voltage values of different NoC agents, hardware elements, pins, I/O interfaces and channels at different times. Power profile specification 706 can also include details of plurality of power profiles at which different NoC agents, blocks, or NoC may need to operate. In an example implementation, physical constraints 708 can include one or more restrictions or limitations such as maximum width of channels, boundaries within which the NoC agents must be placed or kept out, performance requirements, maximum delay, and other such restrictions.

Upon receiving such input information associated with the SoC, position/location of different NoC agents, interconnecting channels, network elements, input/output interfaces, and pins can be determined at step 710. In an example implementation, locations or positions of different pins, interfaces, cross-domain boundaries, number of NoC layers, channel bandwidth, among other attributes can be determined. Once the location/position of agents and other elements are determined, different power profiles and traffic profiles can be assigned to different NoC agents and network elements and size of channels (input channels and out channels), width/depth of channels, buffer sizes of agents and network elements can be determined as shown in step 712 from the given input information and can be assigned to the physically aware NoC design.

At step 714, a tentative physically aware NoC design can be automatically generated from the given input information after determining positions of different agents, network elements, pins, I/O interfaces, boundary details, and configuration of their power profiles and traffic profiles along with depth/size/width configurations of various channels and buffers.

At step 716, a tentative physically aware NoC design specification can be generated for the tentative physically aware NoC design. In an example implementation, the physically aware NoC design specification/script including various details can be generated for different purposes in different formats such as VIP 718, CPF files 720, RTL files 722, synthesis script 724. In an example implementation, one or more physical constraints 726 can be determined and a suggestion to change the input information and physical constraints can be automatically generated.

In an example implementation, at step 728, physical synthesis of the tentative physically aware NoC design can be performed. At step 730, a check can be configured to verify if there are any changes/modifications required in the NoC design due to one or more physical constraints. If no modification/change in the NoC design is required as shown at step 732, it can be interpreted that the designed NoC satisfies all performance requirements and given physical constraints and the generated physically aware design can be finalized. On the other hand, if there are changes/modifications required due to one or more generated physical constraints 726, the process of determining the appropriate location/position of NoC agents, interconnecting channel, network elements, I/O interface and pins can be recursively performed till all the physical constraints and performance requirements are met.

In a related art flow of electronics system design, an intermediate step may not predict the result of subsequent steps to perfect accuracy, although a more coherent flow has narrower gap between the front-end phase and the back-end phase. Hence, progressive and iterative optimization techniques are often applied for design tuning and convergence. Here, the NoC design can be performed using feedback information, which improves the performance of the required specification by recursively determining the position of different NoC agents, network elements, pin, and I/O interfaces, and determining the channels and efficient routing information. Once the first pass to the physical design, i.e. placement and routing is done, detailed physical information can be back-annotated again for progressive ECO optimization.

In an example implementation, the number of NoC layers can be determined based on the physical information of the SoC that provides an indication of the number of wiring layers.

Figure 8:
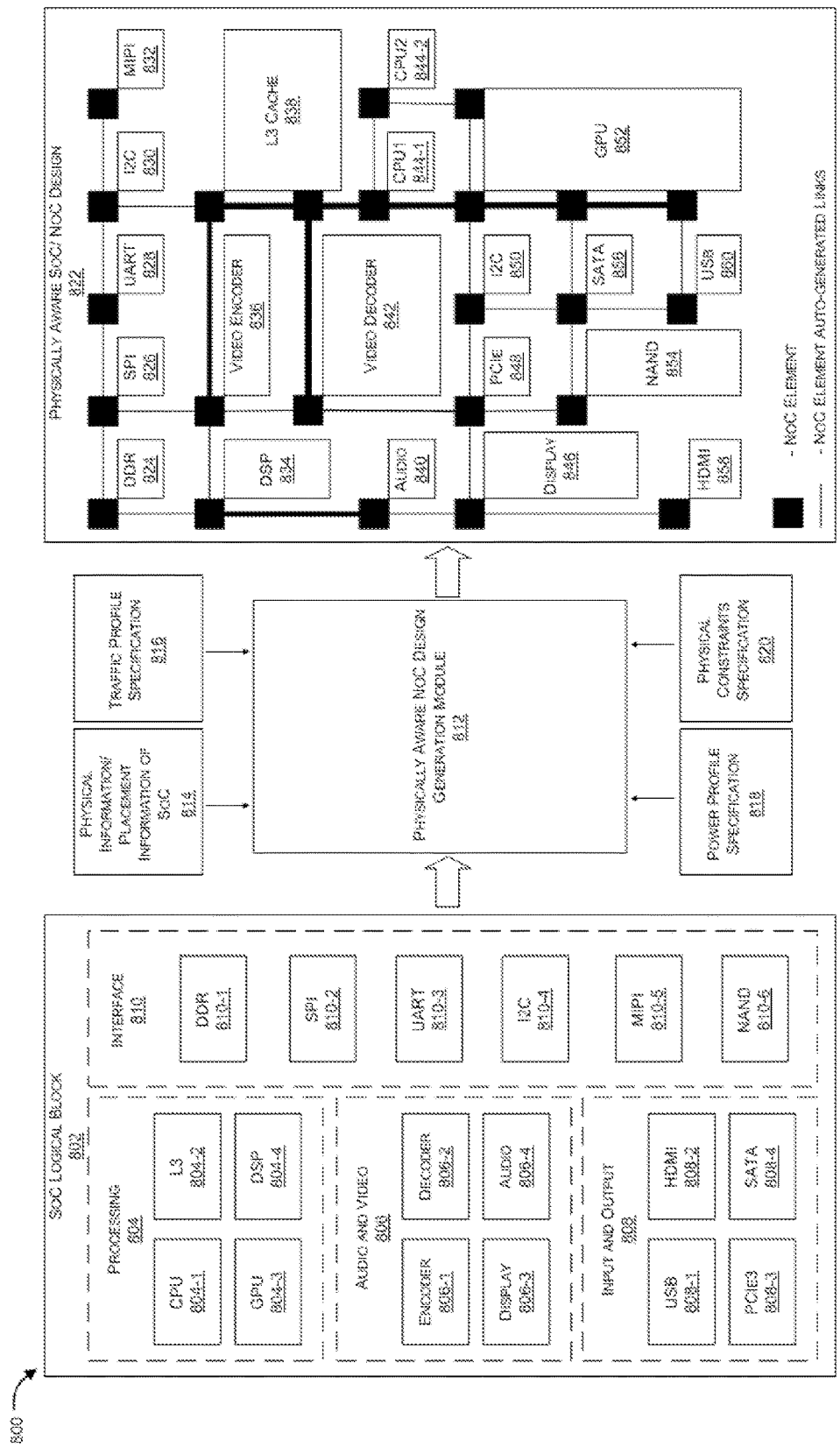
FIG. 8 illustrates an example physically aware SoC/NoC design created in accordance with an example implementation.

FIG. 8 illustrates an example physically aware SoC/NoC design created in accordance with an example implementation. In an example implementation, a physically aware SoC/NoC design 822 can be created for a given SoC logical block 802 based on physical information/placement information of SoC 814, one or more of traffic profile specification 816, power profile specification 818, and physical constraints specification 820. In an example implementation, a physically aware NoC design generation module 812 can be configured to receive a SoC logical block 802, physical information/placement information of SoC 814, and one or more of traffic profile specification 816, power profile specification 818, and physical constraints specification 820, and can create a physically aware SoC/NoC design 822 where the location/position of each hardware component is known, and these components can be connected through dynamically configured/positioned NoC network elements and auto-generated links/channels. As can be seen in FIG. 8, SoC logical block 802 can include high-level information of type of hardware elements to be placed over/in SoC/NoC. For example, the SoC logical block 802 include processing units 804 such as CPU 804-1, L3 804-2, GPU 804-3 and DSP 804-4, and/or audio and video (A/V) units 806 such as A/V encoder 806-1, A/V decoder 806-2, A/V display 806-3 and audio 806-4. The SoC logical block 802 can further include input/output interfaces 808 such as USB 808-1, HDMI 808-2, PCIE3 808-3 and SATA 808-4, other interfaces 810 such as DDR 810-1, SPI 810-2, UART 810-3, I2C 810-4, MIPI 810-5 and NAND 810-6. The SoC logical block 802 can indicate the required hardware elements that need to be placed over a SoC/NoC and for which the physically aware design needs to be created. In an example implementation, physical information/placement information of SoC 814 can include tentative physical location or proximity of hardware elements based on which the physically aware design specification needs to be created. In an example implementation, based on given SoC logical block 802 information and physical information/placement information of SoC 814, physically aware NoC design generation module 812 can create a physically aware SoC/NoC design 822. In example implementations, physically aware NoC design generation module can take one or more input specifications such as traffic profile specification 816, power profile specification 818, and physical constraints specification 820 for creating a more efficient physically aware SoC/NoC design.

As shown in FIG. 8, physically aware SoC/NoC design 822 can include details about placement of each hardware element, their connectivity information, and wire/channel specification. For example, the physically aware SoC/NoC design may have interfaces such DDR 814, SPI 826, UART 828, I2C 830 and MIPI 832 that are placed near to each other and at one end of the chip. Similarly DSP 834, audio 840, video encoder 836, and video decoder 842 can be placed in close proximity and can be connected through optimized auto-placed network elements and auto-generated/configured wire/channels. The processing units such as CPU-1 844-1 and CPU-2 844-2, L3 cache 838, and GPU 852 can be placed together and can be connected through relevant network elements and auto-generated/configured links. In an example implementation, input/output interfaces such as display 856, PCIE 848, I2C 850, SATA 856, NAND 954, HDMI 858 and USB 860 can be placed together other end of the chip and can be connected through optimized set of network elements and wires/channels.

In an example implementation, the physically aware SoC/NoC design 822 can be fully heterogeneous and can include hardware elements that operate in different frequency domains, and/or different time domains, and/or different time/clock frequencies.

In an example implementation, the physically aware SoC/NoC design 822 can include physical information such as silicon fabrication technology information, SoC floor plan information, and SoC wire placement/capacity information. In an example implementation, the physically aware SoC/NoC design 822 can also include other physical information such as timing information of SoC agents/clock domain information of one or more wires and one or more NoC elements, timing constraints, input signal driving strength, and output signal loading strength.

In an example implementation, the physically aware SoC/NoC design 822 can include power grid information of the SoC, voltage domain information, and power domain information of associated SoC agents of the SoC, and physical information of power domains and voltage domains available for NoC usage.

FIG. 9 illustrates an example computer system on which example implementation can be present disclosure can be executed. The computer system 900 includes a server 905 which may involve an I/O unit 935, storage 960, and a processor 910 operable to execute one or more units as known to one of skill in the art. The term "computer-readable medium" as used herein refers to any medium that participates in providing instructions to processor 910 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include carrier waves. The I/O unit processes input from user interfaces 940 and operator interfaces 945 which may utilize input devices such as a keyboard, mouse, touch device, or verbal command.

The server 905 may also be connected to an external storage 950, which can contain removable storage such as a portable hard drive, optical media (CD or DVD), disk media or any other medium from which a computer can read executable code. The server may also be connected an output device 955, such as a display to output data and other information to a user, as well as request additional information from a user. The connections from the server 905 to the user interface 940, the operator interface 945, the external storage 950, and the output device 955 may via wireless protocols, such as the 802.11 standards, Bluetooth® or cellular protocols, or via physical transmission media, such as cables or fiber optics. The output device 955 may therefore further act as an input device for interacting with a user.

The processor 910 may execute one or more modules including physically aware NoC design generation module 911 configured to automatically generate a physically aware Network on Chip (NoC) design based on a System on Chip (SoC) architecture, physical information of the SoC, and SoC traffic specification. In an aspect, the physical information of the SoC can include at least one of silicon fabrication technology information, SoC floor plan information, and SoC wire information. In another aspect, the physical information of the SoC can include at least one of timing information of SoC agents, clock domain information of one or more wires and one or more NoC elements, timing constraints, input signal driver strength and output signal loading. In yet another aspect, the physical information of the SoC can include at least one of power grid information of the SoC, voltage domain information and power domain information of associated SoC agents of the SoC, and physical information of power domains and voltage domains available for NoC usage. In an aspect of the present disclosure, the physically aware NoC design can be automatically generated based on use of the physical SoC information and the SoC traffic specification to automatically generate one or more of one or more NoC bridges, one or more NoC routers and one or more NoC channels at allowable SoC physical positions, and interconnecting SoC agents, NoC routers, and NoC bridges with channels such that performance requirements from the SoC traffic specification are satisfied. The physically aware NoC design generation module 911 can further be configured to automatically generate the physically aware NoC design by using wire information, timing information and clock information of the physical information of the SoC to automatically assign clock domains and clock frequencies to the one or more elements of the NoC design. Module 911 can further be configured to determine clock domains and clock frequencies for NoC channels of the NoC design, and further determine a number of register stages needed on each of the NoC channels to meet timing and performance based on clock domain properties, clock frequency, and wire properties of the each of the NoC channels. Module 911 can further configured to use power information and voltage information of the physical information of the SoC, power states, power activities and the SoC traffic specification to automatically assign voltage domains and power domains to the one or more elements of the NoC design that meets power domain and voltage domain constraints and reduces overall NoC power consumption. Module 911 can further be configured to, for one or more constraint violations occurring during the automatically generating the physically aware NoC design, generate feedback indicating the one or more constraint violations and generating one or more suggestions for modifying an input physical specification.

System of the present disclosure can further include physical information generation module 912 configured to automatically generate physical information associated with one or more elements of the NoC design. In an example implementation, module 912 can be configured to automatically generate the physical information associated with the one or more elements of the NoC design by generating physical information of the one or more elements of the NoC design in a computer readable format, and by generating timing constraints of the NoC design, physical synthesis scripts, and power intent information in a computer readable format. In another aspect, the physical information associated with the one or more elements of the NoC design can be combined with the physical information of the SoC.

System of the present disclosure can further include a physical information updation module 913 configured to update the physical information of the SoC based on the physical information associated with the one or more elements of the NoC design.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a single-core or multi-core processor, such as a general purpose computer, or a distributed set of such processors, such as a general purpose cloud computing server farm, based on instructions stored on a computer-readable medium. If desired, the instructions can be stored on the medium in a compressed and/or encrypted format.

Moreover, other implementations of the present disclosure will be apparent to those skilled in the art from consideration of the specification and practice of the teachings of the present disclosure. Various aspects and/or components of the described example implementations may be used singly or in any combination. It is intended that the specification and example implementations be considered as examples only, with the true scope and spirit of the present disclosure being indicated by the following claims.

What is claimed is:

1. A method, comprising:
   automatically generating a physically aware Network on Chip (NoC) design, based on a System on Chip (SoC) architecture, physical information of the SoC and SoC traffic specification;
   automatically generating physical information associated with one or more elements of the NoC design;
   updating the physical information of the SoC based on the physical information associated with the one or more elements of the NoC design; and
   generating a SoC from the updated physical information of the SoC;
   wherein the automatically generating the physically aware NoC design comprises:
      using the physical SoC information and the SoC traffic specification to automatically generate one or more NoC bridges, one or more NoC routers and one or more NoC channels at allowable SoC physical positions,
      configuring orientations and interface signals for the one or more NoC routers based on placement of the one or more NoC routers at the allowable SoC physical positions, and
      interconnecting SoC agents, the one or more NoC routers, and the one or more NoC bridges with the one or more NoC channels such that performance requirements from the SoC traffic specification are satisfied.

2. The method of claim 1, wherein the physical information of the SoC comprises at least one of: silicon fabrication technology information, SoC floorplan information, and SoC wire information.

3. The method of claim 1 wherein the physical information of the SoC comprises at least one of: timing information of SoC agents, clock domain information of one or more wires and one or more NoC elements, timing constraints, input signal driver strength and output signal loading.

4. The method of claim 1, wherein the physical information of the SoC comprises at least one of: power grid information of the SoC, voltage domain information and power domain information of associated SoC agents of the SoC, and physical information of power domains and voltage domains available for NoC usage.

5. The method of claim 1, wherein the automatically generating the physically aware NoC design comprises:
   using wire information, timing information and clock information of the physical information of the SoC to automatically assign clock domains and clock frequencies to the one or more elements of the NoC design;
   determining clock domains and clock frequencies for NoC channels of the NoC design; and
   determining a number of register stages needed on each of the NoC channels to meet timing and performance based on clock domain properties, clock frequency, and wire properties of the each of the NoC channels.

6. The method of claim 1, wherein the automatic generation of the physically aware NoC design further comprises:
   using power information and voltage information of the physical information of the SoC, power states, power activities and the SoC traffic specification to automatically assign voltage domains and power domains to the one or more elements of the NoC design that meets power domain and voltage domain constraints and reduces overall NoC power consumption.

7. The method of claim 1, further comprising:
   for one or more constraint violations occurring during the automatically generating the physically aware NoC design, generating feedback indicating the one or more constraint violations and generating one or more suggestions for modifying an input physical specification.

8. The method of claim 1, wherein the automatically generating of the physical information associated with the one or more elements of the NoC design comprises:
   generating physical information of the one or more elements of the NoC design in a computer readable format; and
   generating timing constraints of the NoC design, physical synthesis scripts, and power intent information in a computer readable format.

9. The method of claim 8, further comprising combining the physical information associated with the one or more elements of the NoC design with the physical information of the SoC.

10. A non-transitory computer readable medium, storing instructions for executing a process, the instructions comprising:
    automatically generating a physically aware Network on Chip (NoC) design, based on a System on Chip (SoC) architecture, physical information of the SoC and SoC traffic specification;
    automatically generating physical information associated with one or more elements of the NoC design;
    updating the physical information of the SoC based on the physical information associated with the one or more elements of the NoC design; and
    generating a SoC from the updated physical information of the SoC;
    wherein the automatically generating the physically aware NoC design comprises:
       using the physical SoC information and the SoC traffic specification to automatically generate one or more NoC bridges, one or more NoC routers and one or more NoC channels at allowable SoC physical positions;
       configuring orientations and interface signals for the one or more NoC routers based on placement of the one or more NoC routers at the allowable SoC physical positions, and
       interconnecting SoC agents, the one or more NoC routers, and the one or more NoC bridges with the one or more NoC channels such that performance requirements from the SoC traffic specification are satisfied.

11. The non-transitory computer readable medium of claim 10, wherein the physical information of the SoC comprises at least one of: silicon fabrication technology information, SoC floorplan information, and SoC wire information.

12. The non-transitory computer readable medium of claim 10 wherein the physical information of the SoC comprises at least one of: timing information of SoC agents, clock domain information of one or more wires and one or more NoC elements, timing constraints, input signal driver strength and output signal loading.

13. The non-transitory computer readable medium of claim 10, wherein the physical information of the SoC comprises at least one of: power grid information of the SoC, voltage domain information and power domain information of associated SoC agents of the SoC, and physical information of power domains and voltage domains available for NoC usage.

14. The non-transitory computer readable medium of claim 10, wherein the automatically generating the physically aware NoC design comprises:
   using wire information, timing information and clock information of the physical information of the SoC to automatically assign clock domains and clock frequencies to the one or more elements of the NoC design;
   determining clock domains and clock frequencies for NoC channels of the NoC design; and
   determining a number of register stages needed on each of the NoC channels to meet timing and performance based on clock domain properties, clock frequency, and wire properties of the each of the NoC channels.

15. The non-transitory computer readable medium of claim 10, wherein the automatic generation of the physically aware NoC design further comprises:
   using power information and voltage information of the physical information of the SoC, power states, power activities and the SoC traffic specification to automatically assign voltage domains and power domains to the one or more elements of the NoC design that meets power domain and voltage domain constraints and reduces overall NoC power consumption.

16. The non-transitory computer readable medium of claim 10, wherein the instructions further comprise:
   for one or more constraint violations occurring during the automatically generating the physically aware NoC design, generating feedback indicating the one or more constraint violations and generating one or more suggestions for modifying an input physical specification.

17. The non-transitory computer readable medium of claim 10, wherein the automatically generating of the physical information associated with the one or more elements of the NoC design comprises:
   generating physical information of the one or more elements of the NoC design in a computer readable format; and
   generating timing constraints of the NoC design, physical synthesis scripts, and power intent information in a computer readable format.

18. The non-transitory computer readable medium of claim 17, wherein the instructions further comprise combining the physical information associated with the one or more elements of the NoC design with the physical information of the SoC.

* * * * *